US011352943B2

(12) United States Patent
Tabata et al.

(10) Patent No.: US 11,352,943 B2
(45) Date of Patent: Jun. 7, 2022

(54) CONTROL DEVICE FOR HYBRID VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Takahiro Kimura, Tajimi (JP); Yasutaka Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 16/916,673

(22) Filed: Jun. 30, 2020

(65) Prior Publication Data
US 2021/0010410 A1 Jan. 14, 2021

(30) Foreign Application Priority Data
Jul. 9, 2019 (JP) .............................. JP2019-127991

(51) Int. Cl.
*F02D 41/14* (2006.01)
*F02B 37/14* (2006.01)
(Continued)

(52) U.S. Cl.
CPC .............. *F02B 37/14* (2013.01); *B60W 10/06* (2013.01); *B60W 20/10* (2013.01); *F02B 37/22* (2013.01);
(Continued)

(58) Field of Classification Search
CPC ....... B60W 10/06; B60W 20/10; F02B 37/14; F02B 37/22; F02D 2200/0406;
(Continued)

(56) References Cited

U.S. PATENT DOCUMENTS 5,154,057 A * 10/1992 Yoshioka ................ F02B 37/12
60/612
2006/0196183 A1* 9/2006 Isogai ..................... F02D 23/02
60/607

(Continued)

FOREIGN PATENT DOCUMENTS

JP 2013-252803 A 12/2013
JP 2015-150974 A 8/2015

*Primary Examiner* — Carl C Staubach
(74) *Attorney, Agent, or Firm* — Hunton Andrews Kurth LLP

(57) ABSTRACT

A rotation adjusting device is controlled such that an engine speed rising rate at the time of acceleration request is made smaller when a turbocharging pressure is lower than the turbocharging pressure is higher. Therefore, an engine speed can be increased at such a low speed that a rising delay in the turbocharging pressure hardly occurs, in a low turbocharging pressure region. Further, when the rotation adjusting device is controlled such that the engine speed rising rate at the time of the acceleration request is set to a value corresponding to the turbocharging pressure, an MG2 torque is controlled to compensate for an insufficient drive torque of an actual engine torque for a request engine torque. Therefore, even when the engine torque is increased slowly by increasing the engine speed at a slow speed, the insufficient drive torque is compensated for by the MG2 torque.

5 Claims, 9 Drawing Sheets

(51) Int. Cl.
  *F02B 37/22* (2006.01)
  *B60W 10/06* (2006.01)
  *B60W 20/10* (2016.01)
(52) U.S. Cl.
  CPC ....... *F02D 41/145* (2013.01); *F02D 41/1445* (2013.01); *F02D 2250/21* (2013.01); *F02D 2700/035* (2013.01); *F02D 2700/07* (2013.01)
(58) Field of Classification Search
  CPC ......... F02D 2200/1012; F02D 2250/21; F02D 23/00; F02D 2700/035; F02D 2700/07; F02D 31/001; F02D 41/0007; F02D 41/10; F02D 41/1445; F02D 41/145
  See application file for complete search history.

(56) References Cited

U.S. PATENT DOCUMENTS

| | | | | |
|---|---|---|---|---|
| 2009/0265052 | A1* | 10/2009 | Muta | B60W 30/18054 701/22 |
| 2010/0049387 | A1* | 2/2010 | Aoki | B60L 7/14 701/22 |
| 2011/0023828 | A1* | 2/2011 | Kawabe | F02D 41/2467 123/445 |
| 2011/0270499 | A1* | 11/2011 | Saito | F16H 61/66259 701/55 |
| 2012/0101691 | A1* | 4/2012 | Otsuka | F02D 11/105 701/48 |
| 2015/0162862 | A1* | 6/2015 | Brunner | B60W 20/00 318/461 |
| 2017/0204801 | A1* | 7/2017 | Sharma | F02D 41/2451 |
| 2018/0065617 | A1* | 3/2018 | Tsuchida | B60W 30/20 |
| 2021/0031745 | A1* | 2/2021 | Tabata | B60K 6/547 |
| 2021/0031746 | A1* | 2/2021 | Tabata | B60K 6/365 |
| 2021/0039628 | A1* | 2/2021 | Tabata | B60W 10/08 |
| 2021/0086751 | A1* | 3/2021 | Tabata | B60W 20/30 |
| 2021/0229654 | A1* | 7/2021 | Matsubara | B60W 10/08 |

* cited by examiner

| TRAVELING MODE | | | | C1 | B1 | MG1 | MG2 |
|---|---|---|---|---|---|---|---|
| EV | FORWARD/ BACKWARD | SINGLE DRIVE | DRIVE | | | G | M |
| | | | WITH ENGINE BRAKE | △ | △ | G | M |
| | | DUAL DRIVE | | ○ | ○ | M | M |
| HV | FORWARD | HIGH | | | ○ | G | M |
| | | LOW | | ○ | | G | M |
| | BACKWARD | LOW | | ○ | | G | M |

○: ENGAGEMENT
△: ONE OF TWO IS ENGAGED WHEN ENGINE BRAKE IS USED TOGETHER
G: MAINLY GENERATOR
M: MAINLY MOTOR, BUT GENERATOR DURING REGENERATION

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

CONTROL DEVICE FOR HYBRID VEHICLE

CROSS-REFERENCE TO RELATED APPLICATION

This application claims priority to Japanese Patent Application No. 2019-127991 filed on Jul. 9, 2019, incorporated herein by reference in its entirety.

BACKGROUND

1. Technical Field

The disclosure relates to a control device for a hybrid vehicle including an engine with a turbocharger and a rotating machine.

2. Description of Related Art

A control device for a hybrid vehicle is well known, where the hybrid vehicle includes an engine having a turbocharger, a rotation adjusting device capable of mechanically adjusting an engine speed of the engine, a drive wheel to which power of the engine is transmitted, and a rotating machine connected to the drive wheel to transmit power. For example, the control device for the hybrid vehicle is disclosed in Japanese Unexamined Patent Application Publication No. 2013-252803 (JP 2013-252803 A). Here, in a vehicle equipped with the engine having the turbocharger, when the turbocharging pressure is in a low region at the time of acceleration request, a rising delay in turbocharging pressure is likely to occur, and a rise in the output torque of the engine is likely to be delayed. JP 2013-252803 A discloses that a motor is provided as a rotation adjusting device for changing the engine speed, and in order to increase the drive torque without any excess or shortage with respect to an acceleration request, the motor is controlled such that the rate of increase in the engine speed when the acceleration request is made is faster when the turbocharging pressure is relatively low as compared with when the turbocharging pressure is relatively high, whereby the exhaust of the engine is rapidly increased, the turbocharging by the turbocharger is promoted, and thus the output torque of the engine is rapidly increased.

SUMMARY

However, as in the technique described in JP 2013-252803 A, when the rate of increase in the engine speed is increased to promote the turbocharging, the turbocharging pressure is increased after the timing when the engine speed is increased to increase the output torque of the engine, that is the drive torque, in other words, the increase in the engine speed is followed by the increase in the drive torque. In this case, it is likely for a driver to feel uncomfortable, such as a feeling of a sudden increase in the engine speed.

The disclosure has been made in view of the above circumstances, and an object of the disclosure is to provide a control device for hybrid vehicles capable of appropriately increasing drive torque according to an acceleration request while establishing an appropriate relationship between the increase in engine speed and the increase in drive torque at the time of acceleration request.

An aspect of the disclosure relates to (a) a control device for a hybrid vehicle including an engine having a turbocharger, a rotation adjusting device that mechanically adjusts an engine speed of the engine, drive wheels to which power of the engine is transmitted, and a rotating machine connected to the drive wheels to transmit power. The control device includes (b) a rotation speed controller and (c) a rotating machine controller. The rotation speed controller is configured to control the rotation adjusting device such that a rate of change of the engine speed at a time of increasing the engine speed according to an acceleration request is smaller when turbocharging pressure by the turbocharger is lower than when the turbocharging pressure is higher. The rotating machine controller is configured to control output torque of the rotating machine to compensate for an insufficient drive torque of an actual output torque of the engine relative to request output torque that is requested for the engine, when the rotation adjusting device is controlled such that the rate of change of the engine speed is a value corresponding to the turbocharging pressure.

In the control device according to the aspect of the disclosure, the rotation speed controller may be configured to control the rotation adjusting device such that the rate of change of the engine speed increases as the turbocharging pressure increases.

In the control device according to the aspect of the disclosure, the rotation adjusting device may be a first rotating machine to which the power of the engine is transmitted and in which the output torque is controlled such that the engine speed reaches a target value, and the rotating machine may be a second rotating machine.

In the control device according to the aspect of the disclosure, the hybrid vehicle may include a differential mechanism that splits power of the engine to transmit the split power to the drive wheels and the first rotating machine.

In the control device according to the aspect of the disclosure, the rotation adjusting device may be a continuously variable transmission which transmits the power of the engine to the drive wheels and in which a gear ratio is controlled such that the engine speed reaches a target value.

With the control device according to the aspect of the disclosure, since the rotation adjusting device is controlled such that the rate of change of the engine speed at the time of increasing the engine speed according to the acceleration request is made smaller when the turbocharging pressure by the turbocharger is lower than when the turbocharging pressure is higher, it is possible to increase the engine speed at such a low speed that a rising delay in the turbocharging pressure hardly occur, in a low turbocharging pressure region. In addition, when the rotation adjusting device is controlled such that the rate of change of the engine speed is set to a value corresponding to the turbocharging pressure, the output torque of the rotating machine is controlled to compensate for the insufficient drive torque of the actual engine torque for the request output engine torque that is requested for the engine. Therefore, even when the output torque of the engine is increased slowly by increasing the engine speed at a slow speed, the insufficient drive torque is compensated for by the output torque of the rotating machine. Therefore, it is possible to appropriately increase the drive torque according to the acceleration request while establishing an appropriate relationship between the increase in the engine speed and the increase in the drive torque at the time of the acceleration request.

With the control device according to the aspect of the disclosure, since the rotation adjusting device is controlled such that the rate of change of the engine speed increases as the turbocharging pressure increases, the rising delay in the turbocharging pressure hardly occur, and in a region where the turbocharging pressure is high, the engine speed is increased at a relatively high speed. In this way, it is possible to quickly increase the output torque of the engine.

With the control device according to the aspect of the disclosure, in the hybrid vehicle including the engine having the turbocharger, the first rotating machine to which the power of the engine is transmitted and in which the output torque is controlled such that the engine speed reaches the target value, and the second rotating machine connected to the drive wheels to transmit power, it is possible to appropriately increase the drive torque according to the acceleration request while establishing the appropriate relationship between the increase in the engine speed and the increase in the drive torque at the time of acceleration request.

Further, with the control device according to the aspect of the disclosure, in the hybrid vehicle including the engine having the turbocharger, the differential mechanism that splits power of the engine to transmit the split engine to the drive wheels and the first rotating machine, and the second rotating machine connected to the drive wheels to transmit power, it is possible to appropriately increase the drive torque according to the acceleration request while establishing the appropriate relationship between the increase in the engine speed and the increase in the drive torque at the time of acceleration request.

Further, with the control device according to the aspect of the disclosure, in the hybrid vehicle including the engine having the turbocharger, the continuously variable transmission which transmits power of the engine to the drive wheels and in which the gear ratio is controlled such that the engine speed reaches the target value, and the rotating machine connected to the drive wheels to transmit power, it is possible to appropriately increase the drive torque according to the acceleration request while establishing the appropriate relationship between the increase in the engine speed and the increase in the drive torque at the time of acceleration request.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described in detail with reference to the drawings.

Figure 1:
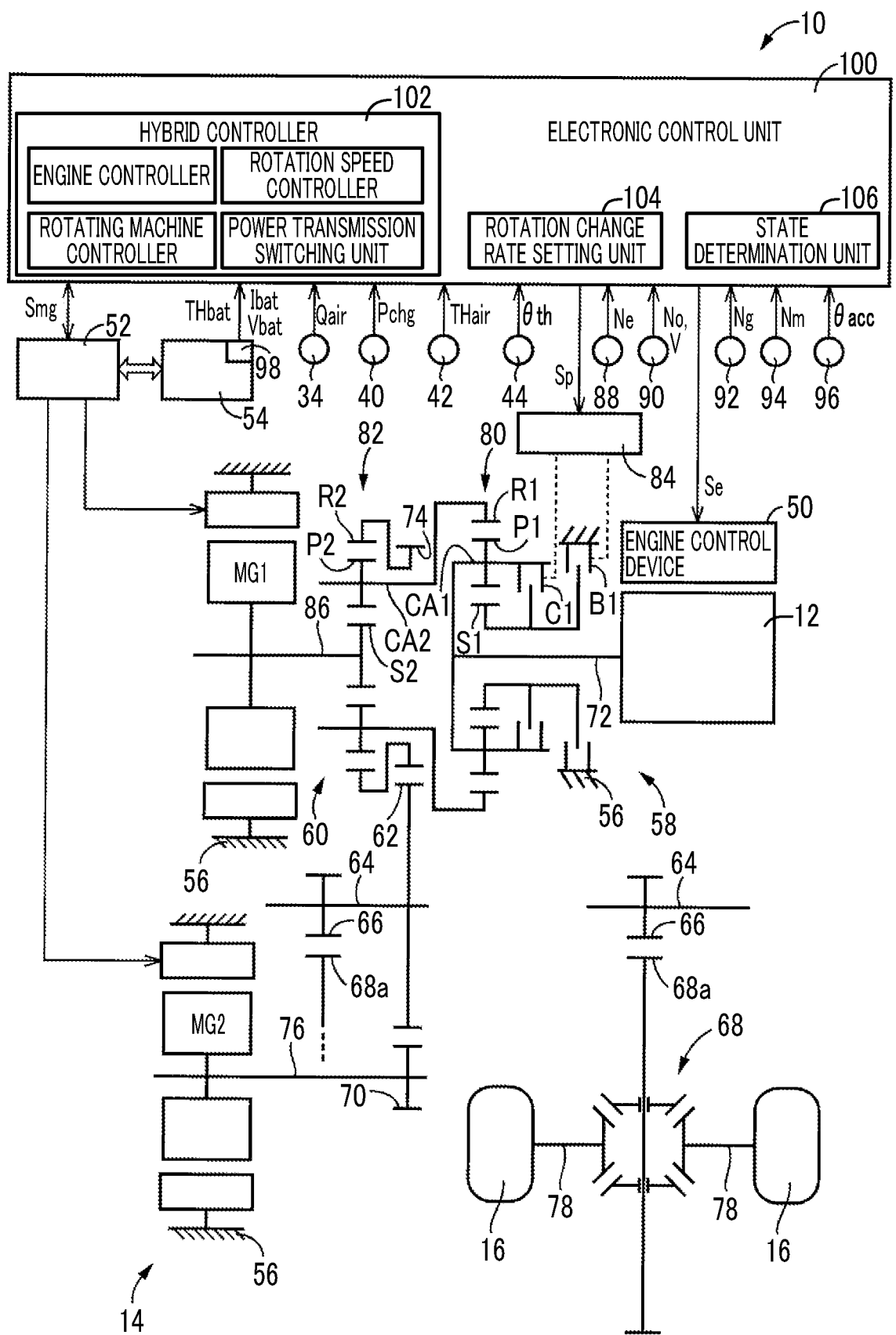
FIG. 1 is a diagram illustrating a schematic configuration of a vehicle to which the disclosure is applied, and illustrating a main part of a control function and a control system for various controls in the vehicle.

FIG. 1 is a diagram illustrating a schematic configuration of a vehicle 10 to which the disclosure is applied, and illustrating a main part of a control function and a control system for various controls in the vehicle 10. In FIG. 1, the vehicle 10 is a hybrid vehicle including an engine 12, a first rotating machine MG1, a second rotating machine MG2, a power transmission device 14, and drive wheels 16.

Figure 2:
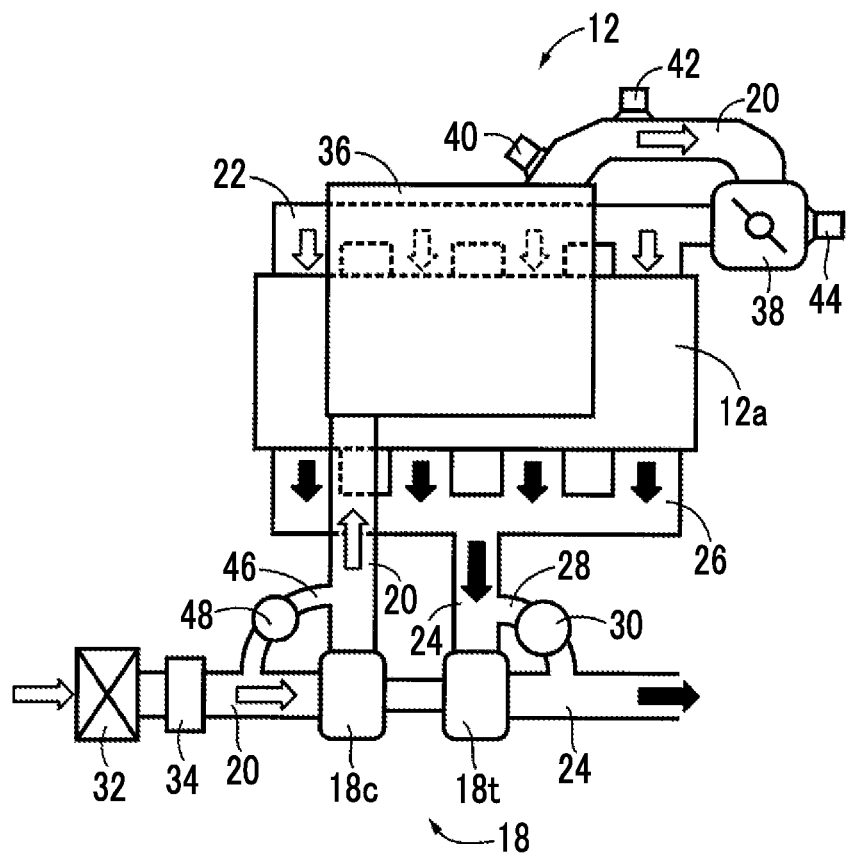
FIG. 2 is a diagram illustrating a schematic configuration of an engine.

FIG. 2 is a diagram illustrating a schematic configuration of the engine 12. In FIG. 2, the engine 12 is a power source for causing the vehicle 10 to travel and is a known internal combustion engine such as a gasoline engine or a diesel engine having a turbocharger 18, that is, an engine with the turbocharger 18. An intake pipe 20 is provided in an intake system of the engine 12, and the intake pipe 20 is connected to an intake manifold 22 attached to an engine main body 12a. An exhaust pipe 24 is provided in an exhaust system of the engine 12, and the exhaust pipe 24 is connected to an exhaust manifold 26 attached to the engine main body 12a. The turbocharger 18 is a known exhaust turbine type turbocharger, that is, a turbocharger having a compressor 18c provided in the intake pipe 20 and a turbine 18t provided in the exhaust pipe 24. The turbine 18t is driven to rotate by the flow of discharging gas, that is, exhaust gas. The compressor 18c is connected to the turbine 18t, and compresses sucking air for the engine 12, that is, intake air, by being rotationally driven by the turbine 18t.

The exhaust pipe 24 is provided in parallel with an exhaust bypass 28 for bypassing the turbine 18t to flow exhaust gas from upstream to downstream of the turbine 18t. The exhaust bypass 28 is provided with a wastegate valve (WGV) 30 for continuously controlling the ratio between the exhaust gas passing through the turbine 18t and the exhaust gas passing through the exhaust bypass 28. The valve opening degree of the wastegate valve 30 is continuously adjusted by operating an actuator (not shown) by an electronic control unit 100 to be described later. The larger the valve opening degree of the wastegate valve 30 is, the more easily the exhaust gas of the engine 12 is discharged through the exhaust bypass 28. Therefore, in the turbocharging state of the engine 12 in which the turbocharging operation of the turbocharger 18 is effective, the turbocharging pressure Pchg by the turbocharger 18 decreases as the valve opening degree of the wastegate valve 30 increases. The turbocharging pressure Pchg by the turbocharger 18 is the pressure of the intake air, and is the air pressure downstream of the compressor 18c in the intake pipe 20. The low part of the turbocharging pressure Pchg is, for example, the part representing the intake pressure in the non-turbocharging state of the engine 12 in which the turbocharging operation of the turbocharger 18 is not effective at all, in other words, the part representing the pressure of intake air in the engine without the turbocharger 18.

An air cleaner 32 is provided at an inlet of the intake pipe 20, and an air flow meter 34 for measuring an intake air amount Qair of the engine 12 is provided in the intake pipe 20 downstream of the air cleaner 32 and upstream of the compressor 18c. An intercooler 36, which is a heat exchanger for cooling intake air compressed by the turbocharger 18 by performing heat exchange between the intake air and outside air or coolant, is provided in the intake pipe 20 downstream of the compressor 18c. An electronic throttle valve 38, which is controlled to be opened and closed by operating a throttle actuator (not shown) by an electronic control unit 100 to be described later, is provided in the intake pipe 20 downstream of the intercooler 36 and upstream of the intake manifold 22. In the intake pipe 20 between the intercooler 36 and the electronic throttle valve 38, a turbocharging pressure sensor 40 for detecting a turbocharging pressure Pchg by the turbocharger 18 and an intake air temperature sensor 42 for detecting an intake air temperature THair which is the temperature of the intake air are provided. In the vicinity of the electronic throttle valve 38, for example, in a throttle actuator, a throttle valve opening degree sensor 44 for detecting a throttle valve opening degree θth, which is an opening degree of the electronic throttle valve 38, is provided.

In the intake pipe 20, an air recirculation bypass 46 for bypassing the compressor 18c from downstream to upstream of the compressor 18c to recirculate air is provided in parallel. In the air recirculation bypass 46, for example, an air bypass valve (ABV) 48 is provided that is opened when the electronic throttle valve 38 is suddenly closed to suppress generation of surge and protect the compressor 18c.

In the engine 12, an engine control device 50 (see FIG. 1) including an electronic throttle valve 38, a fuel injection device, an ignition device, a wastegate valve 30, and the like, is controlled by the electronic control unit 100 to be described later, which, in turn, the engine torque Te, which is the output torque of the engine 12, is controlled.

Returning to FIG. 1, the first rotating machine MG1 and the second rotating machine MG2 are rotating electric machines having a function as an electric motor (motor) and a function as a generator, and are so-called motor generators. The first rotating machine MG1 and the second rotating machine MG2 can be power sources for the vehicle 10 to travel. Each of the first rotating machine MG1 and the second rotating machine MG2 is connected to a battery 54 provided in the vehicle 10 through an inverter 52 provided in the vehicle 10. In the first rotating machine MG1 and the second rotating machine MG2, an MG1 torque Tg, which is the output torque of the first rotating machine MG1, and an MG2 torque Tm, which is the output torque of the second rotating machine MG2, are controlled, respectively, by controlling the inverter 52 by the electronic control unit 100, which will be described later. For example, in the case of positive rotation, the output torque of the rotating machine is a powering torque at a positive torque during accelerating, and a regenerative torque at a negative torque during decelerating. The battery 54 is a power storage device that exchanges electric power with each of first rotating machine MG1 and second rotating machine MG2. The first rotating machine MG1 and the second rotating machine MG2 are provided in a case 56, which is a non-rotating member attached to the vehicle body.

The power transmission device 14 includes a transmission unit 58, a differential unit 60, a driven gear 62, a driven shaft 64, a final gear 66, a differential gear 68, a reduction gear 70, and the like, in the case 56. The transmission unit 58 and the differential unit 60 are arranged coaxially with an input shaft 72, which is an input rotating member of the transmission unit 58. The transmission unit 58 is connected to the engine 12 through the input shaft 72 or the like. The differential unit 60 is connected in series with the transmission unit 58. The driven gear 62 meshes with a drive gear 74, which is an output rotating member of the differential unit 60. The driven shaft 64 fixes the driven gear 62 and the final gear 66 such that the driven gear 62 and the final gear 66 cannot rotate relative to each other. The final gear 66 has a smaller diameter than the driven gear 62. The differential gear 68 meshes with the final gear 66 through a differential ring gear 68a. The reduction gear 70 has a smaller diameter than the driven gear 62 and meshes with the driven gear 62. The reduction gear 70 is connected to the rotor shaft 76 of the second rotating machine MG2, which is disposed in parallel with the input shaft 72 separately from the input shaft 72, and is connected to the second rotating machine MG2 to transmit power. In addition, the power transmission device 14 includes an axle 78 connected to the differential gear 68, and the like.

The power transmission device 14 configured as described above is suitably used for a front engine and front drive (FF) type or rear engine and rear drive (RR) type vehicle. In the power transmission device 14, the power output from each of the engine 12, the first rotating machine MG1, and the second rotating machine MG2 is transmitted to the driven gear 62, and from the driven gear 62, the power is transmitted to the drive wheels 16 sequentially through the final gear 66, the differential gear 68, the axle 78 and the like. Thus, the second rotating machine MG2 is a rotating machine connected to the drive wheels 16 to transmit power. In the power transmission device 14, the engine 12, the transmission unit 58, the differential unit 60, and the first rotating machine MG1 are arranged on the different axis from the second rotating machine MG2, and thus the shaft length is reduced. Further, it is possible to increase the reduction ratio of the second rotating machine MG2. In addition, unless otherwise distinguished, power includes torque and force in terms of its meaning.

The transmission unit 58 includes a first planetary gear mechanism 80, a clutch C1, and a brake B1. The differential unit 60 includes a second planetary gear mechanism 82. The first planetary gear mechanism 80 is a known single pinion type planetary gear device including a first sun gear S1, a first pinion P1, a first carrier CA1 that rotatably and revolvably supports the first pinion P1, and a first ring gear R1 that meshes with the first sun gear S1 through the first pinion P1. The second planetary gear mechanism 82 is a known single pinion type planetary gear device including a second sun gear S2, a second pinion P2, a second carrier CA2 that rotatably and revolvably supports the second pinion P2, and a second ring gear R2 that meshes with the second sun gear S2 through the second pinion P2.

In the first planetary gear mechanism 80, the first carrier CA1 is a rotating element which is integrally connected to the input shaft 72, and to which the engine 12 is connected through the input shaft 72 to transmit power. The first sun gear S1 is a rotating element selectively connected to the case 56 through the brake B1. The first ring gear R1 is a rotating element connected to the second carrier CA2 of the second planetary gear mechanism 82, which is an input rotating member of the differential unit 60, and functions as an output rotating member of the transmission unit 58. Further, the first carrier CA1 and the first sun gear S1 are selectively connected through a clutch C1.

Each of the clutch C1 and the brake B1 is a wet frictional engagement device, and is a multi-plate hydraulic frictional engagement device where the engagement is controlled by a hydraulic actuator. With a hydraulic control circuit 84 provided in the vehicle 10 being controlled by an electronic control unit 100, which will be described later, operating states of the clutch C1 and the brake B1, such as engagement and release, are switched according to regulated hydraulic pressures Pc1 and Pb1 output from the hydraulic control circuit 84, respectively.

In a state where both the clutch C1 and the brake B1 are released, the differential of the first planetary gear mechanism 80 is allowed. Accordingly, in this state, since the reaction torque of the engine torque Te cannot be obtained in the first sun gear S1, the transmission unit 58 is in a neutral state in which mechanical power cannot be transmitted, that is, in a neutral state. In a state in which the clutch C1 is engaged and the brake B1 is released, the first planetary gear mechanism 80 has the rotating elements integrally rotated. Therefore, in this state, the rotation of the engine 12 is transmitted at a constant speed from the first ring gear R1 to the second carrier CA2. On the other hand, in a state where the clutch C1 is released and the brake B1 is engaged, in the first planetary gear mechanism 80, the rotation of the first sun gear S1 is stopped, and the rotation of the first ring gear R1 is faster than the rotation of the first carrier CA1. Therefore, in this state, the rotation of the engine 12 is accelerated and output from the first ring gear R1. As described above, the transmission unit 58 functions as a two-stage stepped transmission that allows the switching between a low gear with a gear ratio of "1.0", meaning a direct coupled condition, and a high gear with a gear ratio of "0.7", meaning an overdrive condition, for example. When the clutch C1 and the brake B1 are both engaged, the rotation of each rotating element of the first planetary gear mechanism 80 is stopped. Accordingly, in this state, the rotation of the first ring gear R1, which is the output rotating member of the transmission unit 58, is stopped, and thus the rotation of the second carrier CA2, which is the input rotating member of the differential unit 60, is stopped.

In the second planetary gear mechanism 82, the second carrier CA2 is a rotating element connected to the first ring gear R1, which is an output rotating member of the transmission unit 58, and functions as an input rotating member of the differential unit 60. The second sun gear S2 is integrally connected to the rotor shaft 86 of the first rotating machine MG1, and is a rotating element to which the first rotating machine MG1 is connected to transmit power. The second ring gear R2 is integrally connected to the drive gear 74, is a rotating element connected to the drive wheels 16 to transmit power, and functions as an output rotating member of the differential unit 60. The second planetary gear mechanism 82 is a power split device mechanically splitting the power of the engine 12 to be input to the second carrier CA2 through the transmission unit 58 into the first rotating machine MG1 and the drive gear 74. That is, the second planetary gear mechanism 82 is a differential mechanism splitting the power of the engine 12 to transmit the split power to the drive wheels 16 and the first rotating machine MG1. In the second planetary gear mechanism 82, the second carrier CA2 functions as an input element, the second sun gear S2 functions as a reaction element, and the second ring gear R2 functions as an output element. The differential unit 60 forms, together with the first rotating machine MG1 which is connected to the second planetary gear mechanism 82 to transmit power, an electric transmission mechanism for controlling the differential state of the second planetary gear mechanism 82 by controlling the operating state of the first rotating machine MG1, for example, an electric continuously variable transmission. The first rotating machine MG1 is a rotating machine to which the power of the engine 12 is transmitted. Since the transmission unit 58 is overdriven, the increase in the torque of the first rotating machine MG1 is suppressed. It is to be noted that controlling the operating state of the first rotating machine MG1 means performing operation control of the first rotating machine MG1.

Figure 3:
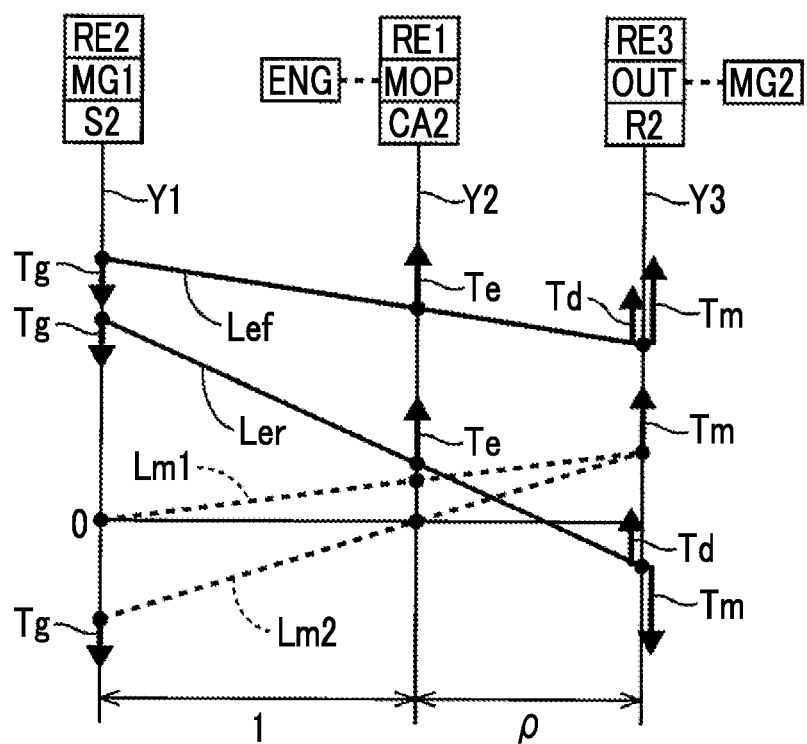
FIG. 3 is an alignment chart relatively showing a rotation speed of each of rotating elements in a differential unit.

FIG. 3 is an alignment chart relatively showing a rotation speed of each of the rotating elements in the differential unit 60. In FIG. 3, three vertical lines Y1, Y2, and Y3 correspond to three rotating elements of the second planetary gear mechanism 82 constituting the differential unit 60. The vertical line Y1 represents the rotation speed of the second sun gear S2, which is the second rotating element RE2 to which the first rotating machine MG1 (see "MG1" in the figure) is connected. The vertical line Y2 represents the rotation speed of the second carrier CA2, which is the first rotating element RE1 to which the engine 12 (see "ENG" in the figure) is connected through the transmission unit 58. The vertical line Y3 represents the rotation speed of the second ring gear R2, which is the third rotating element RE3, which is integrally connected to the drive gear 74 (see "OUT" in the figure). The second rotating machine MG2 (see "MG2" in the figure) is connected to the driven gear 62 that meshes with the drive gear 74 through the reduction gear 70 and the like. A mechanical oil pump (see "MOP" in the figure) provided in the vehicle 10 is connected to the second carrier CA2. The mechanical oil pump is driven by the rotation of the second carrier CA2, and supplies oil used for the engagement operation of the clutch C1 and the brake B1, the lubrication of each part, and the cooling of each part. When the rotation of the second carrier CA2 is stopped, oil is supplied by an electric oil pump (not shown) provided in the vehicle 10. The intervals between the vertical lines Y1, Y2, and Y3 are determined according to the gear ratio ρ of the second planetary gear mechanism 82 (the number of teeth of the sun gear/the number of teeth of the ring gear). When the space between the sun gear and the carrier is set to an interval corresponding to "1" in the relationship between the vertical axes of the alignment chart, the space between the carrier and the ring gear is set to an interval corresponding to the gear ratio ρ.

A solid line Lef in FIG. 3 indicates an example of relative speeds of respective rotating elements in forward traveling in an HV traveling mode, where the HV traveling mode is a traveling mode in which hybrid traveling (=HV traveling) is possible such that traveling is performed using at least the engine 12 as a power source. Further, a solid line Ler in FIG. 3 indicates an example of the relative speeds of respective rotating elements in backward traveling in the HV traveling mode. In the HV traveling mode, in the second planetary gear mechanism 82, for example, when the MG1 torque Tg generated by the first rotating machine MG1, which is a reaction torque of a negative torque with respect to the engine torque Te of the positive torque input to the second carrier CA2 through the transmission unit 58, is input to the second sun gear S2, a positive torque Td which is directly transmitted to the engine appears in the second ring gear R2. For example, in a case where the clutch C1 is engaged and the brake B1 is released and the transmission unit 58 is in the direct coupled condition of the gear ratio "1.0", when the MG1 torque Tg $(=-\rho/(1+\rho)\times Te)$, which is the reaction torque with respect to the engine torque Te input to the second carrier CA2, is input to the second sun gear S2, the torque Td $(=Te/(1+\rho)=-(1/\rho)\times Tg)$ which is directly transmitted to the engine appears in the second ring gear R2. Then, according to the request driving force, the total torque of the torque Td directly transmitted to the engine and the MG2 torque Tm transmitted to the driven gear 62 can be transmitted to the drive wheels 16 as the drive torque of the vehicle 10. The first rotating machine MG1 functions as a generator when negative torque is generated by positive rotation. The battery 54 is charged with the generated electric power Wg of the first rotating machine MG1, and the second rotating machine MG2 consumes the generated electric power. The second rotating machine MG2 outputs the MG2 torque Tm by using all or some of the generated electric power Wg or by using the power from the battery 54 in addition to the generated electric power Wg. The MG2 torque Tm at the time of forward traveling is a powering torque that is a positive torque of positive rotation, and the MG2 torque Tm at the time of backward traveling is a powering torque that is a negative torque of negative rotation.

The differential unit 60 can be operated as an electric continuously variable transmission. For example, in the HV traveling mode, the operating state of the first rotating machine MG1 is controlled based on the output rotation speed No, which is the rotation speed of the drive gear 74 constrained by the rotation of the drive wheels 16, and thus the rotation speed of second carrier CA2 is increased or decreased when the rotation speed of the first rotating machine MG1, that is, the rotation speed of second sun gear S2 is increased or decreased. Since the second carrier CA2 is connected to the engine 12 through the transmission unit 58, the engine speed Ne, which is the engine speed of the engine 12, is increased or decreased by increasing or decreasing the rotation speed of the second carrier CA2. Therefore, in hybrid traveling, it is possible to perform control for setting the engine operating point Peng to an efficient operating point. This type of hybrid is called a machine split type or a split type. The first rotating machine MG1 is a rotating machine capable of controlling the engine speed Ne. As described above, the first rotating machine MG1 functions as a rotation adjusting device capable of mechanically adjusting the engine speed Ne. The reference to the "can mechanically adjust the engine speed Ne" means that the engine speed Ne can be controlled by a device to which the engine 12 is mechanically connected to transmit power and does not mean that the engine speed Ne can be controlled by the engine control device 50. The operating point is an operating point represented by the rotation speed and the torque, and the engine operating point Peng is an operating point of the engine 12 represented by the engine speed Ne and the engine torque Te.

A dashed line Lm1 in FIG. 3 indicates an example of relative speeds of respective rotating elements in forward traveling, in a single drive EV mode in which motor traveling using just the second rotating machine MG2 as a power source can be performed, among the EV traveling (=EV traveling) modes. A dashed line Lm2 in FIG. 3 indicates an example of relative speeds of respective rotating elements in forward traveling, in a dual drive EV mode in which motor traveling using both the first rotating machine MG1 and the second rotating machine MG2 as the power source can be performed, among the EV traveling modes. The EV traveling mode is a traveling mode in which motor traveling can be performed by using at least one of the first rotating machine MG1 and the second rotating machine MG2 as a power source in a state where the operation of the engine 12 is stopped.

In the single drive EV mode, the clutch C1 and the brake B1 are both released, and the transmission unit 58 is in the neutral state, and thus the differential unit 60 is also in the neutral state. In this state, the MG2 torque Tm can be transmitted to the drive wheels 16 as drive torque of the vehicle 10. In the single drive EV mode, for example, in order to reduce drag loss or the like in the first rotating machine MG1, the first rotating machine MG1 is maintained at zero rotation. For example, even if control is performed to maintain the first rotating machine MG1 at zero rotation, since the differential unit 60 is in the neutral state, it does not affect the drive torque.

In the dual drive EV mode, the clutch C1 and the brake B1 are both engaged to stop the rotation of each of rotating elements of the first planetary gear mechanism 80, and thus the second carrier CA2 is stopped to zero rotation. In this state, the MG1 torque Tg and the MG2 torque Tm can be transmitted to the drive wheels 16 as drive torque of the vehicle 10.

Returning to FIG. 1, the vehicle 10 further includes the electronic control unit 100 as a controller including a control device of the vehicle 10 related to control of the engine 12, the first rotating machine MG1, the second rotating machine MG2, and the like. The electronic control unit 100 includes, for example, a so-called microcomputer having a CPU, a RAM, a ROM, an input/output interface, and the like. The CPU performs various controls of the vehicle 10 by using a temporary storage function of the RAM and performing signal processing according to a program stored in the ROM in advance. The electronic control unit 100 may include computers for engine control, rotating machine control, hydraulic control, and the like, as necessary.

The electronic control unit 100 receives various signals or the like (for example, the intake air amount Qair, the turbocharging pressure Pchg, the intake air temperature THair, the throttle valve opening degree θth, the engine speed Ne of the engine, the output rotation speed No corresponding to the vehicle speed V, the MG1 rotation speed Ng which is the rotation speed of the first rotating machine MG1, the MG2 rotation speed Nm which is the rotation speed of second rotating machine MG2, the accelerator operation amount θacc which is the accelerator operation amount of the driver indicating the magnitude of accelerator operation of the driver, the battery temperature THbat of battery 54, the battery charge/discharge current Ibat, the battery voltage Vbat, and the like) based on detection values by various sensors, or the like, provided in the vehicle 10 (for example, an air flow meter 34, a turbocharging pressure sensor 40, an intake air temperature sensor 42, a throttle valve opening degree sensor 44, an engine speed sensor 88, an output rotation speed sensor 90, an MG1 rotation speed sensor 92, an MG2 rotation speed sensor 94, an accelerator operation amount sensor 96, a battery sensor 98, and the like). From the electronic control unit 100, various command signals (for example, an engine control command signal Se for controlling the engine 12, a rotating machine control command signal Smg for controlling the first rotating machine MG1 and the second rotating machine MG2, a hydraulic control command signal Sp for controlling each operating state of clutch C1 and brake B1, and the like) are output to respective devices (for example, the engine control device 50, the inverter 52, the hydraulic control circuit 84, and the like) provided in the vehicle 10.

The electronic control unit 100 calculates a state of charge SOC [%] as a value indicating the state of charge of the battery 54 based on, for example, the battery charge/discharge current Ibat and the battery voltage Vbat. Further, the electronic control unit 100 calculates chargeable/dischargeable electric powers Win and Wout that define a usable range of the battery power Pbat, which is the power of the battery 54, based on, for example, the battery temperature THbat and the state of charge SOC of the battery 54. The chargeable/dischargeable electric powers Win and Wout are a chargeable power Win as an inputtable power that defines a limit on the input power of the battery 54 and a dischargeable power Wout as an outputable power that defines a limit on the output power of the battery 54, respectively. For example, the chargeable/dischargeable electric powers Win and Wout decreases as the battery temperature THbat decreases in a low temperature range where the battery temperature THbat is lower than the normal range, and decreases as the battery temperature THbat increases in a high temperature range where the battery temperature THbat is higher than the normal range. The chargeable electric power Win decreases as the state of charge SOC increases, for example, in a region where the state of charge SOC is high. The dischargeable electric power Wout decreases as the state of charge SOC decreases, for example, in a region where the state of charge SOC is low.

The electronic control unit 100 includes a hybrid control unit, that is, a hybrid controller 102 to implement various controls in the vehicle 10.

The hybrid controller 102 includes an engine control unit for controlling the operation of the engine 12, that is, a function as an engine controller, a rotating machine control unit for controlling the operations of the first rotating machine MG1 and the second rotating machine MG2 through the inverter 52, that is, a function as a rotating machine controller, and a power transmission switching unit for switching the power transmission state in the transmission unit 58, that is, a function as the power transmission switching unit, and with the above-mentioned control functions, performs hybrid drive control and the like by the engine 12, the first rotating machine MG1 and the second rotating machine MG2.

The hybrid controller 102 applies the accelerator operation amount θacc and the vehicle speed V to, for example, a driving force map, which is a relationship stored in advance experimentally or by design, that is, a predetermined relationship to calculate the request drive torque Twdem, which is the drive torque Tw requested for the vehicle 10. In other words, the request drive torque Twdem is the request drive power Pwdem at the vehicle speed V at that time. Here, an output rotation speed No or the like may be used instead of the vehicle speed V.

In order to implement the request drive power Pwdem by at least one power source of the engine 12, the first rotating machine MG1, and the second rotating machine MG2 in consideration of the request charge/discharge power, and the like, which is the charge/discharge power requested for the battery 54, the hybrid controller 102 outputs the engine control command signal Se, which is the command signal for controlling the engine 12 and the rotating machine control command signal Smg, which is the command signal for controlling the first rotating machine MG1 and the second rotating machine MG2.

For example, when the vehicle travels in the HV traveling mode, the engine control command signal Se is a command value of the engine power Pe that outputs the target engine torque Tetgt in the target engine speed Netgt in consideration of an optimum engine operating point Pengf, where the request engine power Pedem obtained by adding the request charge/discharge power, charge/discharge efficiency in the battery 54, or the like, to the request drive power Pwdem is implemented. Further, the rotating machine control command signal Smg is a command value of the generated electric power Wg of the first rotating machine MG1 that outputs the MG1 torque Tg at the rotation speed Ng of the MG1 at the time of command output as a reaction torque for setting the engine speed Ne to the target engine speed Netgt, and a command value of power consumption Wm of the second rotating machine MG2 that outputs the MG2 torque Tm at the rotation speed Nm of the MG2 at the time of command output. The MG1 torque Tg in the HV traveling mode is calculated, for example, in feedback control in which the first rotating machine MG1 is operated such that the engine speed Ne reaches the target engine speed Netgt. The MG2 torque Tm in the HV traveling mode is calculated to obtain the request drive torque Twdem, for example, in combination with the drive torque Tw based on the torque Td directly transmitted to the engine. The optimum engine operating point Pengf is predetermined, for example, as the engine operating point Peng at which the total fuel efficiency of the vehicle 10 is in its best considering the charge/discharge efficiency of the battery 54 in addition to the fuel efficiency of the engine 12 alone, when the request engine power Pedem is implemented. The target engine speed Netgt is a target value of the engine speed Ne, the target engine torque Tetgt is a target value of the engine torque Te, and the engine power Pe is the power from the engine 12. As described above, the vehicle 10 is a vehicle that controls the MG1 torque Tg, which is the reaction torque of the first rotating machine MG1, such that the engine speed Ne reaches the target engine speed Netgt. That is, the first rotating machine MG1 is a rotating machine in which MG1 torque Tg is controlled such that the engine speed Ne reaches the target engine speed Netgt. In other words, the differential unit 60 is a continuously variable transmission that transmits the power of the engine 12 to the drive wheels 16 and controls the gear ratio (=the rotation speed of the second carrier CA2/output rotation speed No) such that the engine speed Ne reaches the target engine speed Netgt, and functions as a rotation adjusting device capable of mechanically adjusting the engine speed Ne.

Figure 4:
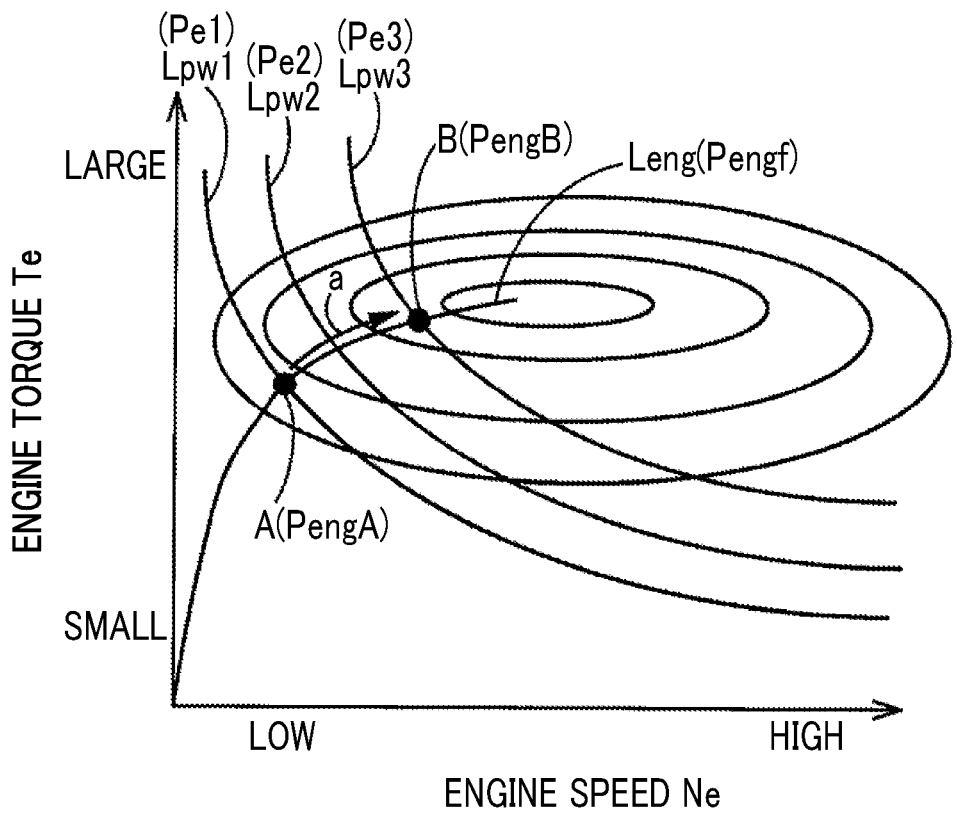
FIG. 4 is a diagram illustrating an example of an optimum engine operating point.

FIG. 4 is a diagram illustrating an example of optimum engine operating points Pengf on two-dimensional coordinates using the engine speed Ne of the engine and the engine torque Te as variables. In FIG. 4, a solid line Leng indicates a group of optimum engine operating points Pengf. The equal power lines Lpw1, Lpw2, and Lpw3 indicate an example when the request engine powers Pedem are the request engine power Pe1, Pe2, Pe3, respectively. Point A is an engine operating point PengA when the request engine power Pe1 is achieved on the optimum engine operating point Pengf, and point B is an engine operating point PengB when the request engine power Pe3 is achieved on the optimum engine operating point Pengf. The points A and B are also target values of the engine operating points Peng represented by the target engine speed Netgt and the target engine torque Tetgt, that is, the target engine operating points Pengtgt. When, for example, the target engine operating point Pengtgt is changed from the point A to the point B due to an increase in the accelerator operation amount θacc, control is performed such that the engine operating point Peng is changed on the path a passing over the optimum engine operating point Pengf.

The hybrid controller 102 selectively establishes the EV traveling mode or the HV traveling mode as the traveling mode according to the traveling state, and causes the vehicle 10 to travel in each traveling mode. For example, when the request drive power Pwdem is in a motor traveling region smaller than the predetermined threshold, the hybrid controller 102 establishes the EV traveling mode, and when the request drive power Pwdem is in a hybrid traveling region equal to or greater than the predetermined threshold, the hybrid controller 102 establishes the HV traveling mode. Even when the request drive power Pwdem is in the motor traveling region, the hybrid controller 102 establishes the HV traveling mode when the state of charge SOC of the battery 54 is less than a predetermined engine start threshold or when the engine 12 needs to be warmed up. The engine start threshold is a predetermined threshold for determining whether or not the state of charge SOC is a value at which the battery 54 needs to be charged through forcible start of the engine 12.

Figure 5:
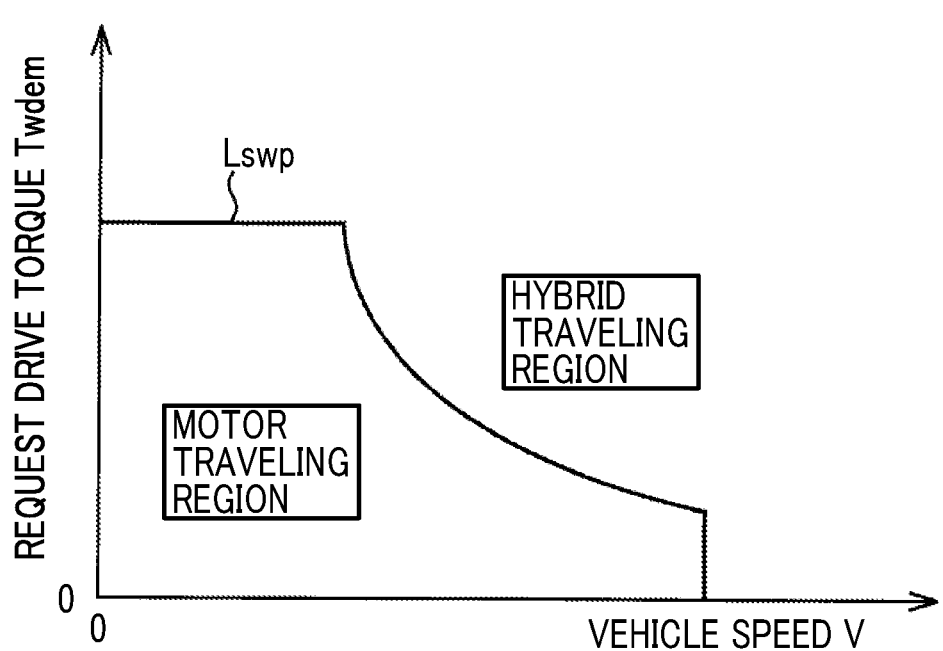
FIG. 5 is a diagram illustrating an example of a power source switching map used for switching control between motor traveling and hybrid traveling.

FIG. 5 is a diagram illustrating an example of a power source switching map used for switching control between motor traveling and hybrid traveling. In FIG. 5, a solid line Lswp is a boundary line between the motor traveling region and the hybrid traveling region for switching between the motor traveling and the hybrid traveling. A region where the request drive power Pwdem is relatively small, in which the vehicle speed V is relatively low and the request drive torque Twdem is relatively small, is predetermined in the motor traveling region. A region where the request drive power Pwdem is relatively large, in which the vehicle speed V is relatively high or the request drive torque Twdem is relatively large, is predetermined in the hybrid traveling region. When the state of charge SOC of the battery 54 is less than the engine start threshold or when the engine 12 needs to be warmed up, the motor traveling region in FIG. 5 may be changed to the hybrid traveling region.

When the EV traveling mode is established, the hybrid controller 102 establishes the single drive EV mode when the request drive power Pwdem can be implemented just by the second rotating machine MG2. On the other hand, when the EV traveling mode is established, the hybrid controller 102 establishes the dual drive EV mode when the request drive power Pwdem cannot be implemented just by the second rotating machine MG2. Even when the request drive power Pwdem can be implemented just by the second rotating machine MG2, the hybrid controller 102 may establish the dual drive EV mode when it is more efficient to use the first rotating machine MG1 and the second rotating machine MG2 together than to use merely the second rotating machine MG2.

When the HV traveling mode is established when the operation of the engine 12 is stopped, the hybrid controller 102 performs the start control for starting the engine 12. When the engine 12 is to be started, the hybrid controller 102 starts the engine 12, for example, by increasing the engine speed Ne by the first rotating machine MG1 and making ignition when the engine speed Ne becomes equal to or higher than a predetermined engine speed at which ignition is possible. That is, the hybrid controller 102 starts the engine 12 by cranking the engine 12 with the first rotating machine MG1.

The hybrid controller 102 controls each engagement operation of the clutch C1 and the brake B1 based on the established traveling mode. The hybrid controller 102 outputs, to the hydraulic control circuit 84, a hydraulic control command signal Sp for engaging and/or releasing each of the clutch C1 and the brake B1 such that power transmission for traveling in the established traveling mode is enabled.

Figures 6, 7:
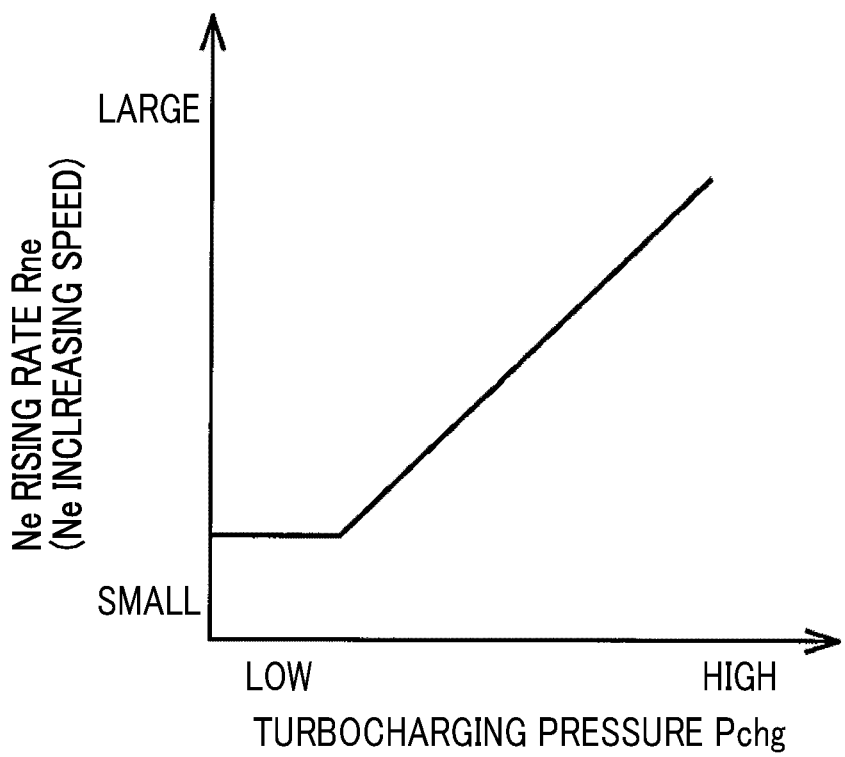
FIG. 6 is a table showing operating states of a clutch and a brake in each traveling mode.
FIG. 7 is a diagram illustrating an example of an engine speed (Ne) rising rate at the time of acceleration request.

FIG. 6 is a table showing operating states of the clutch C1 and the brake B1 in each traveling mode. In FIG. 6, 0 mark indicates the engagement of each of the clutch C1 and the brake B1, blank indicates release, and A mark indicates that one of the two is engaged when the engine 12 in the rotation-stopped state is used with the engine brake to bring the engine 12 into the rotation state. "G" mark indicates that the first rotating machine MG1 mainly functions as a generator, and "M" mark indicates that each of the first rotating machine MG1 and the second rotating machine MG2 mainly functions as a motor when it is driven, and mainly functions as a generator during regeneration. The vehicle 10 can selectively implement the EV traveling mode and the HV traveling mode as the traveling mode. The EV traveling mode has two modes: a single drive EV mode and a dual drive EV mode.

The single drive EV mode is implemented in a state where both the clutch C1 and the brake B1 are released. In the single drive EV mode, since the clutch C1 and the brake B1 are released, the transmission unit 58 is in the neutral state. When transmission unit 58 is set to the neutral state, the differential unit 60 is set to the neutral state in which the reaction torque of MG1 torque Tg is not taken in the second carrier CA2 connected to first ring gear R1. In this state, the hybrid controller 102 causes the second rotating machine MG2 to output the MG2 torque Tm for traveling (see the dashed line Lm1 in FIG. 3). In the single drive EV mode, it is also possible to rotate the second rotating machine MG2 reversely with respect to forward traveling to travel backward.

In the single drive EV mode, the first ring gear R1 is rotated by the second carrier CA2, but since the transmission unit 58 is in the neutral state, the engine 12 is not rotated and is stopped at zero rotation. Therefore, when the regenerative control is performed by the second rotating machine MG2 during traveling in the single drive EV mode, a large regenerative amount can be obtained. When the battery 54 is fully charged and regenerative energy cannot be obtained during traveling in the single drive EV mode, it is conceivable to use an engine brake together. When the engine brake is used together, the brake B1 or the clutch C1 is engaged (see "WITH ENGINE BRAKE" in FIG. 6). When the brake B1 or the clutch C1 is engaged, the engine 12 is brought into the rotation state, and the engine brake is applied.

The dual drive EV mode is implemented in a state where the clutch C1 and the brake B1 are both engaged. In the dual drive EV mode, the rotation of each rotating element of the first planetary gear mechanism 80 is stopped by the engagement of the clutch C1 and the brake B1, the engine 12 is in a stopped state at zero rotation, and the rotation of the second carrier CA2 connected to the first ring gear R1 is also stopped. When the rotation of the second carrier CA2 is stopped, since the reaction torque of the MG1 torque Tg can be obtained in the second carrier CA2, the MG1 torque Tg can be mechanically output from the second ring gear R2 and transmitted to the drive wheels 16. In this state, the hybrid controller 102 causes the first rotating machine MG1 and the second rotating machine MG2 to output the MG1 torque Tg and the MG2 torque Tm for traveling (see the dashed line Lm2 in FIG. 3). In the dual drive EV mode, it is also possible to cause both the first rotating machine MG1 and the second rotating machine MG2 to rotate reversely with respect to forward traveling to travel backward.

The low state of the HV traveling mode is implemented in a state where the clutch C1 is engaged and a state where the brake B1 is released. In the low state of the HV traveling mode, since the clutch C1 is engaged, the rotating elements of the first planetary gear mechanism 80 are integrally rotated, and the transmission unit 58 is brought into a direct coupled condition. Therefore, the rotation of the engine 12 is transmitted at a constant speed from the first ring gear R1 to the second carrier CA2. The high state of the HV traveling mode is implemented when the brake B1 is engaged and the clutch C1 is released. In the high state of the HV traveling mode, the rotation of the first sun gear S1 is stopped by the engagement of the brake B1, and the transmission unit 58 is brought into an overdrive condition. Therefore, the rotation of the engine 12 is accelerated and transmitted from the first ring gear R1 to the second carrier CA2. In the HV traveling mode, the hybrid controller 102 outputs the MG1 torque Tg, which is a reaction torque to the engine torque Te, by the electric power generation of the first rotating machine MG1, and outputs the MG2 torque Tm from the second rotating machine MG2 by the generated electric power Wg of the first rotating machine MG1 (see the solid line Lef in FIG. 3). In the HV traveling mode, for example, in the low state of the HV traveling mode, it is also possible to rotate the second rotating machine MG2 reversely with respect to the forward traveling to travel backward (see the solid line Ler in FIG. 3). In the I-TV traveling mode, it is possible to further add the MG2 torque Tm using the electric power from the battery 54 for traveling. In the HV traveling mode, for example, when the vehicle speed V is relatively high and the request drive torque Twdem is relatively small, the high state of the HV traveling mode is established.

Here, in the vehicle 10 including the engine 12 having the turbocharger 18, when the turbocharging pressure Pchg is low at the time of acceleration request, a so-called turbo lag occurs, and the rising of the engine torque Te is likely to be delayed. In response to such a turbo lag, when the rising speed of the engine speed Ne at the time of acceleration request is increased, that is, when the rising rate Rne, which is the rate of change of the engine speed Ne at the time of increasing the engine speed Ne according to the acceleration request, is increased, the exhaust of the engine 12 is rapidly increased, and the turbocharging by the turbocharger 18 is promoted. However, when the Ne rising rate Rne is increased to promote turbocharging, the engine torque Te, that is, the drive torque Tw is increased after the increase in the engine speed Ne, and thus it is likely for a driver to feel uncomfortable, such as a feeling of a sudden increase in the engine speed Ne. The reference to the "acceleration request" refers to, for example, an increase in the accelerator operation amount θacc by the driver, that is, an increase in the accelerator on, or an increase in the request drive torque Twdem by the autonomous driving control including known cruise control and the like.

The electronic control unit 100 further includes a rotation change rate setting unit, that is, a rotation change rate setting unit 104, and a state determination unit, that is, a state determination unit 106 to implement a control function for appropriately increasing the drive torque Tw according to the acceleration request while establishing the appropriate relationship between the increase in the engine speed Ne and the increase in the drive torque Tw at the time of the acceleration request.

The state determination unit 106 determines whether or not it is in a turbocharging state in which the turbocharging operation by the turbocharger 18 is effective, that is, whether or not the turbocharging is being performed. The state determination unit 106 determines whether or not the turbocharging is being performed based on whether or not the turbocharging pressure Pchg is equal to or higher than the predetermined turbocharging pressure Pchgf. The predetermined turbocharging pressure Pchgf is, for example, a predetermined lower limit value of the turbocharging pressure Pchg at which determination can be made that the turbocharging operation by the turbocharger 18 is effective.

The rotation change rate setting unit 104 sets the Ne rising rate Rne at the time of acceleration request. When the state determination unit 106 determines that the turbocharging is not being performed, the rotation change rate setting unit 104 sets the Ne rising rate Rne at the time of non-turbocharging. On the other hand, when the state determination unit 106 determines that the turbocharging is being performed, the rotation change rate setting unit 104 sets the Ne rising rate Rne at the time of turbocharging.

FIG. 7 is a diagram illustrating an example of the Ne rising rate Rne at the time of acceleration request. In FIG. 7, the state where the turbocharging pressure Pchg is low is the same as the state at the time of non-turbocharging. The Ne rising rate Rne at the time of the acceleration request is set to a larger value as the turbocharging pressure Pchg is higher. In a low turbocharging pressure region where the rising delay in the turbocharging pressure Pchg is likely to occur, an Ne rising rate Rne of a small value is set in advance such that the engine speed Ne can be increased at such a low speed that the rising delay in the turbocharging pressure Pchg hardly occurs. In a high turbocharging pressure region where the rising delay in the turbocharging pressure Pchg hardly occurs, an Ne rising rate Rne of a large value is set in advance such that the engine speed Ne can be increased at such a high speed that the engine torque Te can be rapidly increased. The Ne rising rate Rne at the time of non-turbocharging is set to, for example, a value equal to or substantially equal to that in the region where the turbocharging pressure Pchg is low, that is, a minimum value of the Ne rising rate Rne. Further, for example, as the increase amount of the accelerator operation amount θacc or the increasing change rate of the accelerator operation amount θacc increases, the gradient in the characteristics of the Ne rising rate Rne illustrated in FIG. 7 is increased or the minimum value of the Ne rising rate Rne is increased.

As described above, based on the turbocharging pressure Pchg by the turbocharger 18, the rotation change rate setting unit 104 sets the Ne rising rate Rne at the time of the acceleration request to be a smaller value when the turbocharging pressure Pchg is lower than when the turbocharging pressure Pchg is higher. Referring to FIG. 7, the rotation change rate setting unit 104 sets the Ne rising rate Rne at the time of acceleration request to a larger value as the turbocharging pressure Pchg increases.

The hybrid controller 102 controls the first rotating machine MG1 such that the actual Ne rising rate Rne is the Ne rising rate Rne at the time of the acceleration request set by the rotation change rate setting unit 104. Controlling the Ne rising rate Rne by the first rotating machine MG1 is equivalent to controlling the Ne rising rate Rne by controlling the gear ratio of the differential unit 60. As described above, the hybrid controller 102 functions as a rotation speed controller that controls the rotation adjusting device such that the Ne rising rate Rne at the time of the acceleration request is made smaller when the turbocharging pressure Pchg is lower than when the turbocharging pressure Pchg is higher.

When the Ne rising rate Rne is made smaller when the turbocharging pressure Pchg is relatively low to suppress the feeling of the sudden increase in the engine speed Ne and the like, the actual engine torque Ter is likely to be insufficient for the request engine torque Tedem for achieving the request drive torque Twdem. The request engine torque Tedem is a request output torque requested for the engine 12, and the actual engine torque Ter is an actual engine torque Te output by the engine 12.

When the Ne rising rate Rne at the time of the acceleration request is set based on the turbocharging pressure Pchg, that is, when the rotation adjusting device is controlled such that the Ne rising rate Rne at the time of the acceleration request is set to a value corresponding to the turbocharging pressure Pchg, the hybrid controller 102 performs torque assist by the second rotating machine MG2 that controls MG2 torque Tm to compensate for an insufficient drive torque Tw of the actual engine torque Ter for the request engine torque Tedem.

Figure 8:
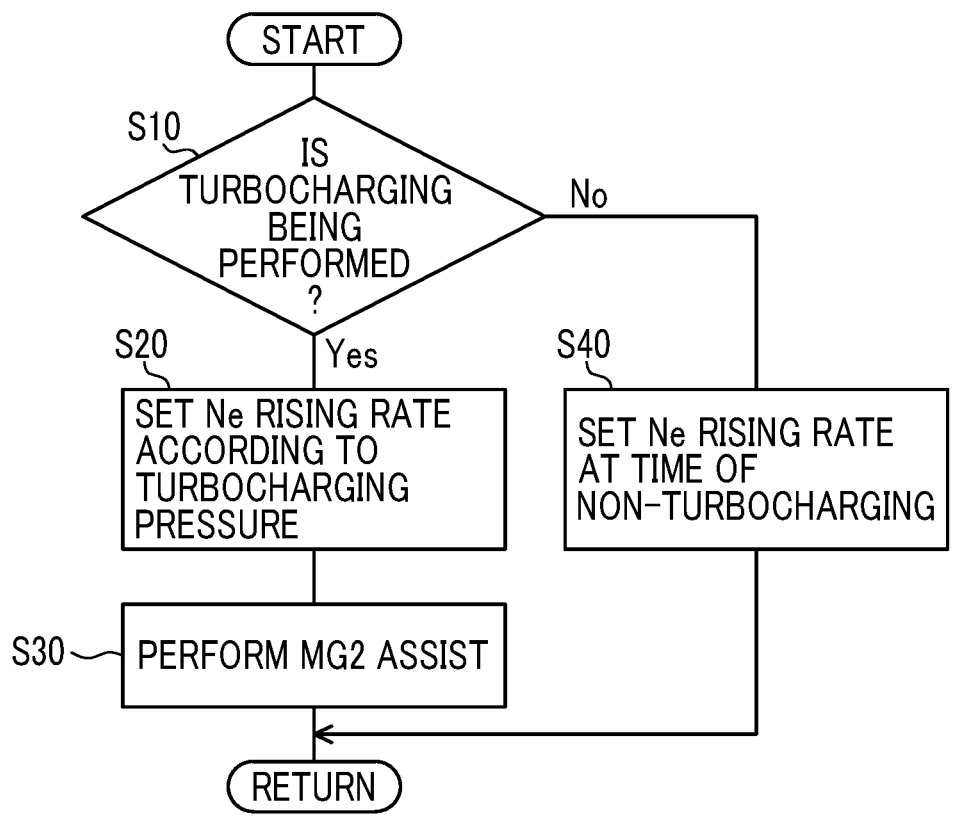
FIG. 8 is a flowchart illustrating a main part of a control operation of an electronic control unit, that is, a control operation for appropriately increasing a drive torque according to the acceleration request while establishing an appropriate relationship between the increase in the engine speed and the increase in the drive torque at the time of the acceleration request.
Figure 9:
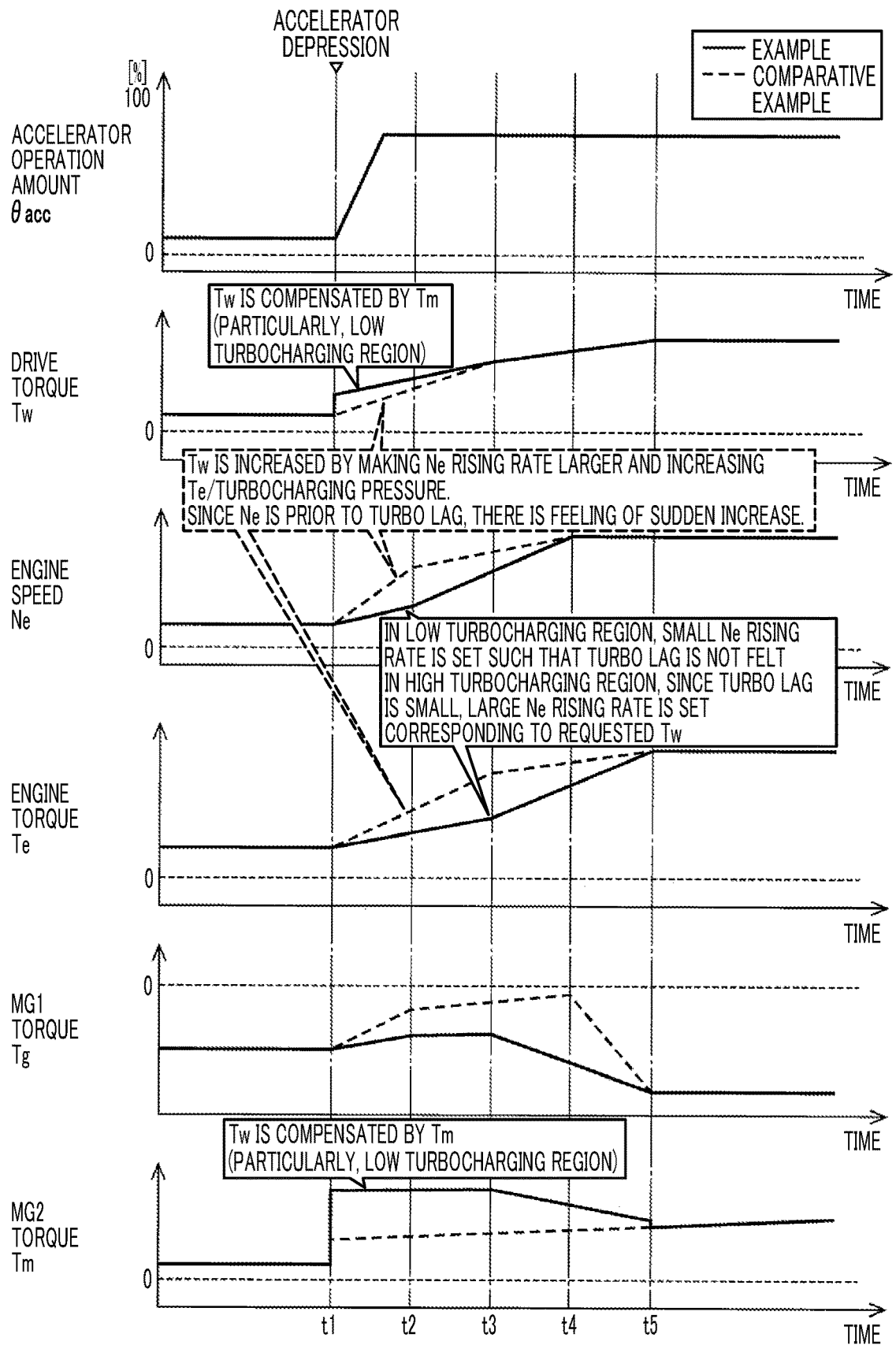
FIG. 9 is a diagram illustrating an example of a time chart when the control operation shown in the flowchart of FIG. 8 is executed.

FIG. 8 is a flowchart illustrating a main part of a control operation of the electronic control unit 100, that is, a control operation for appropriately increasing a drive torque Tw according to the acceleration request while establishing the appropriate relationship between the increase in the engine speed Ne and the increase in the drive torque Tw at the time of the acceleration request, which is repeatedly executed, for example, at the time of acceleration request. FIG. 9 is a diagram illustrating an example of a time chart when the control operation shown in the flowchart of FIG. 8 is executed.

In FIG. 8, first, in step (hereinafter, step is omitted) S10 corresponding to the function of the state determination unit 106, determination is made whether or not turbocharging is being performed. When the determination in S10 is affirmative, in S20 corresponding to the function of the rotation change rate setting unit 104, the Ne rising rate Rne is set based on the turbocharging pressure Pchg (for example, see a map as shown in FIG. 7). Next, in S30 corresponding to the function of the hybrid controller 102, the torque assist by the second rotating machine MG2 is executed, and the insufficient drive torque Tw is compensated for. On the other hand, when the determination in S10 is negative, in S40 corresponding to the function of the rotation change rate setting unit 104, the Ne rising rate Rne at the time of non-turbocharging is set.

FIG. 9 is a diagram illustrating an example in which the accelerator operation amount θacc is increased by the accelerator operation by the driver and the vehicle is accelerated. In FIG. 9, a time t1 indicates a time point at which accelerator depression is started. In a comparative example indicated by a dashed line, in a region where the engine speed Ne is low and the turbocharging pressure Pchg is low, a relatively large Ne rising rate Rne is set, and the engine speed Ne is increased at a relatively high speed by controlling the first rotating machine MG1 (see time t1 to time t2). Then, when the engine speed Ne is increased and the turbocharging pressure Pchg is increased, a relatively small Ne rising rate Rne is set, and the engine speed Ne is increased at a relatively low speed by controlling the first rotating machine MG1 (see time t2 to time t4). By such control, the turbocharging pressure Pchg, that is, the engine torque Te is increased, and the drive torque Tw is increased (see time t1 to time t5). However, since the engine speed Ne is increased (see time t1 to time t2) by the amount of the turbo lag prior to the increase of the drive torque Tw (see time t1 to time t3), a feeling of a sudden increase in the engine speed Ne occurs. On the other hand, in the embodiment shown by a solid line, in a region where the engine speed Ne is low and the turbocharging pressure Pchg is low, a relatively small Ne rising rate Rne is set such that the turbo lag is not felt, and the engine speed Ne is increased at a relatively low speed by controlling the first rotating machine MG1 (see time t1 to time t2). Then, when the engine speed Ne is increased and the turbocharging pressure Pchg is increased, the turbo lag is reduced, and thus, a relatively large Ne rising rate Rne is set corresponding to the requested drive torque Tw, and the engine speed Ne is increased at a relatively high speed by controlling the first rotating machine MG1 (see time t2 to time t4). Further, in the embodiment shown by the solid line, especially in the range of the low engine speed Ne where the relatively small Ne rising rate Rne is set, the torque assist is executed by the second rotating machine MG2, and the insufficient drive torque Tw is compensated for by the MG2 torque Tm. Through the above control, the drive torque Tw is appropriately increased according to the accelerator depression while the feeling of a sudden increase in the engine speed Ne, and the like is suppressed (see time t1 to time t5).

As described above, according to the disclosure, the rotation adjusting device, that is the first rotating machine MG1 is controlled such that the Ne rising rate Rne at the time of acceleration request is made smaller when the turbocharging pressure Pchg is lower than the turbocharging pressure Pchg is higher. Therefore, the engine speed Ne can be increased at such a low speed that a rising delay in the turbocharging pressure Pchg hardly occurs, in the region where the turbocharging pressure Pchg is low. In addition, when the rotation adjusting device is controlled such that the Ne rising rate Rne at the time of the acceleration request is set to a value corresponding to the turbocharging pressure Pchg, the MG2 torque Tm is controlled to compensate for the insufficient drive torque Tw of the actual engine torque Ter for the request engine torque Tedem. Therefore, even when the engine torque Te is increased slowly by increasing the engine speed Ne at a slow speed, the insufficient drive torque Tw is compensated for by the MG2 torque Tm. Therefore, it is possible to appropriately increase the drive torque Tw according to the acceleration request while establishing an appropriate relationship between the increase in the engine speed Ne and the increase in the drive torque Tw at the time of the acceleration request.

Further, according to the embodiment, the rotation adjusting device is controlled such that the Ne rising rate Rne increases as the turbocharging pressure Pchg increases, the rising delay of the turbocharging pressure Pchg hardly occurs. Therefore, in the region where the turbocharging pressure Pchg is high, the engine speed Ne can be increased at a relatively high speed, and the engine torque Te can be increased rapidly.

Next, other embodiments of the disclosure will be described. In the following description, portions common to the embodiments are denoted by the same reference signs, and description thereof is omitted.

Figure 10:
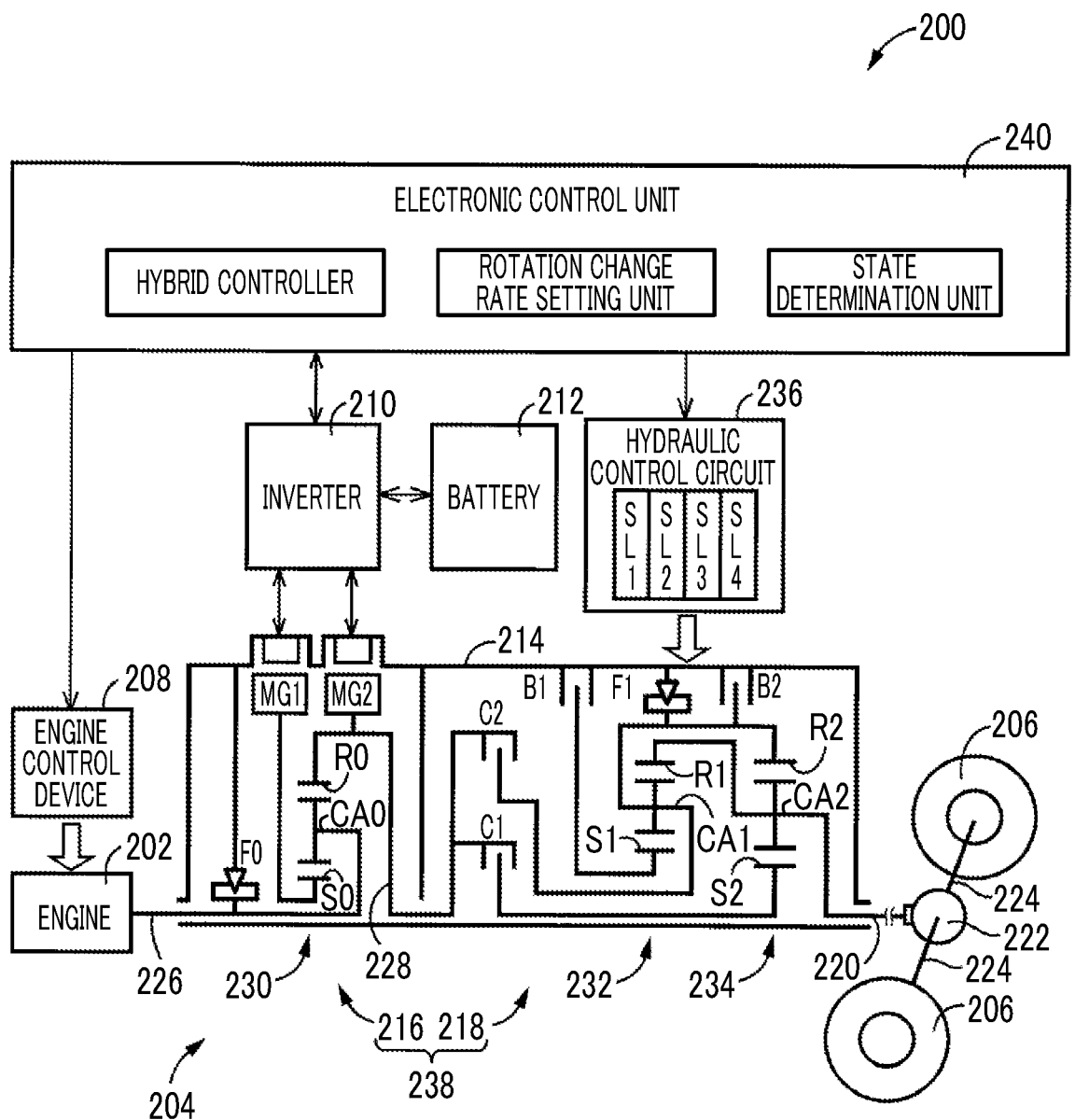
FIG. 10 is a diagram illustrating a schematic configuration of a vehicle to which the disclosure is applied and which is different from the vehicle of FIG. 1.

The embodiment exemplifies a vehicle 200 as shown in FIG. 10, which is different from the vehicle 10 shown in the above first embodiment. FIG. 10 is a diagram illustrating a schematic configuration of a vehicle 200 to which the disclosure is applied. In FIG. 10, the vehicle 200 is a hybrid vehicle including an engine 202, a first rotating machine MG1, a second rotating machine MG2, a power transmission device 204, and drive wheels 206.

The engine 202, the first rotating machine MG1, and the second rotating machine MG2 have the same configuration as the engine 12, the first rotating machine MG1, and the second rotating machine MG2 described in the first embodiment. In the engine 202, the engine torque Te is controlled by controlling an engine control device 208, such as an electronic throttle valve, a fuel injection device, an ignition device, and a wastegate valve provided in the vehicle 200, by an electronic control unit 240 to be described later. Each of the first rotating machine MG1 and the second rotating machine MG2 is connected to a battery 212 provided in the vehicle 200 through an inverter 210 provided in the vehicle 200. In the first rotating machine MG1 and the second rotating machine MG2, the MG1 torque Tg and the MG2 torque Tm are controlled by controlling the inverter 210 by the electronic control unit 240, respectively.

The power transmission device 204 includes an electric continuously variable transmission unit 216, a mechanical stepped transmission unit 218, and the like, which are arranged in series on a common axis in a case 214 as a non-rotating member mounted to the vehicle body. The electric continuously variable transmission unit 216 is directly or indirectly connected to the engine 202 through a damper (not shown) or the like. The mechanical stepped transmission unit 218 is connected to the output side of the electric continuously variable transmission unit 216. The power transmission device 204 includes a differential gear device 222 connected to an output shaft 220 which is an output rotating member of the mechanical stepped transmission unit 218, a pair of axles 224 connected to the differential gear device 222, and the like. In the power transmission device 204, power output from the engine 202 and the second rotating machine MG2 is transmitted to the mechanical stepped transmission unit 218, and is transmitted from the mechanical stepped transmission unit 218 to the drive wheels 206 through the differential gear device 222 and the like. The power transmission device 204 configured as described above is suitably used for a vehicle of a front engine and rear drive (FR) system. Hereinafter, the electric continuously variable transmission unit 216 is referred to as a continuously variable transmission unit 216, and the mechanical stepped transmission unit 218 is referred to as a stepped transmission unit 218. Further, the continuously variable transmission unit 216, the stepped transmission unit 218, and the like are configured substantially symmetrically with respect to the common axis, and the lower half of the axis is omitted in FIG. 10. The common axis is the axis of a crankshaft of the engine 202, a connection shaft 226 connected to the crankshaft, and the like.

The continuously variable transmission unit 216 includes a differential mechanism 230 as a power split device mechanically splitting the power of the engine 202 into the first rotating machine MG1 and the intermediate transmission member 228 that is the output rotating member of the continuously variable transmission unit 216. The first rotating machine MG1 is a rotating machine to which the power of the engine 202 is transmitted. The second rotating machine MG2 is connected to the intermediate transmission member 228 to transmit power. Since the intermediate transmission member 228 is connected to the drive wheels 206 through the stepped transmission unit 218, the second rotating machine MG2 is a rotating machine connected to the drive wheels 206 to transmit power. The differential mechanism 230 is a differential mechanism that splits the power of the engine 202 to transmit the split power to the drive wheels 206 and the first rotating machine MG1. The continuously variable transmission unit 216 is an electric continuously variable transmission in which the differential state of the differential mechanism 230 is controlled by controlling the operating state of the first rotating machine MG1. The first rotating machine MG1 is a rotating machine capable of controlling the engine speed Ne. That is, the first rotating machine MG1 functions as a rotation adjusting device capable of mechanically adjusting the engine speed Ne.

The differential mechanism 230 may be a single pinion type planetary gear device, and includes a sun gear S0, a carrier CA0, and a ring gear R0. The engine 202 is connected to the carrier CA0 through the connection shaft 226 to transmit power, the sun gear S0 is connected to the first rotating machine MG1 to transmit power, and the ring gear R0 is connected to the second rotating machine MG2 to transmit power. In the differential mechanism 230, the carrier CA0 functions as an input element, the sun gear S0 functions as a reaction element, and the ring gear R0 functions as an output element.

The stepped transmission unit 218 is a mechanical transmission mechanism as a stepped transmission that forms a part of a power transmission path between the intermediate transmission member 228 and the drive wheels 206, that is, an automatic transmission that forms a part of a power transmission path between the differential mechanism 230 and the drive wheels 206. The intermediate transmission member 228 also functions as an input rotating member of the stepped transmission unit 218. The stepped transmission unit 218 is a known planetary gear type automatic transmission including, for example, a plurality of sets of planetary gear devices of a first planetary gear device 232 and a second planetary gear device 234, and a plurality of engagement devices of the clutch C1, the clutch C2, the brake B1, and the brake B2, together with the one-way clutch F1. Hereinafter, the clutch C1, the clutch C2, the brake B1, and the brake B2 are simply referred to as an engagement device CB unless otherwise specified.

The engagement device CB is a hydraulic frictional engagement device including a multi-plate or single-plate clutch or brake pressed by a hydraulic actuator, a band brake tightened by a hydraulic actuator, and the like. The engagement device CB switches the operating state, such as engagement or release, by changing the engagement torque Tcb, which is torque capacity, with the regulated engagement hydraulic pressure PRcb of the engagement device CB output from each of solenoid valves SL1 to SL4 and the like in a hydraulic control circuit 236 provided in the vehicle 200.

The stepped transmission unit 218 is configured such that the rotating elements of the first planetary gear device 232 and the second planetary gear device 234 are partially connected to each other directly or indirectly through the engagement device CB or the one-way clutch F1, or connected to the intermediate transmission member 228, the case 214, or the output shaft 220. The rotating elements of the first planetary gear device 232 is a sun gear S1, a carrier CAL and a ring gear R1, and rotating elements of the second planetary gear device 234 is a sun gear S2, a carrier CA2, and a ring gear R2.

When any one of the engagement devices is engaged, in the stepped transmission unit 218, any one is formed among plurality of gear stages having different gear ratios γat (=AT input rotation speed Ni/AT output rotation speed No). In the embodiment, the gear stage formed by a stepped transmission unit 218 is referred to as an AT gear stage. The AT input rotation speed Ni is the input rotation speed of the stepped transmission unit 218, has the same value as the rotation speed of the intermediate transmission member 228, and has the same value as the MG2 rotation speed Nm. The AT output rotation speed No is the rotation speed of the output shaft 220 that is the output rotation speed of the stepped transmission unit 218, and is also the output rotation speed of the composite transmission 238, which is the entire transmission including the continuously variable transmission unit 216 and the stepped transmission unit 218.

Figures 11, 12:
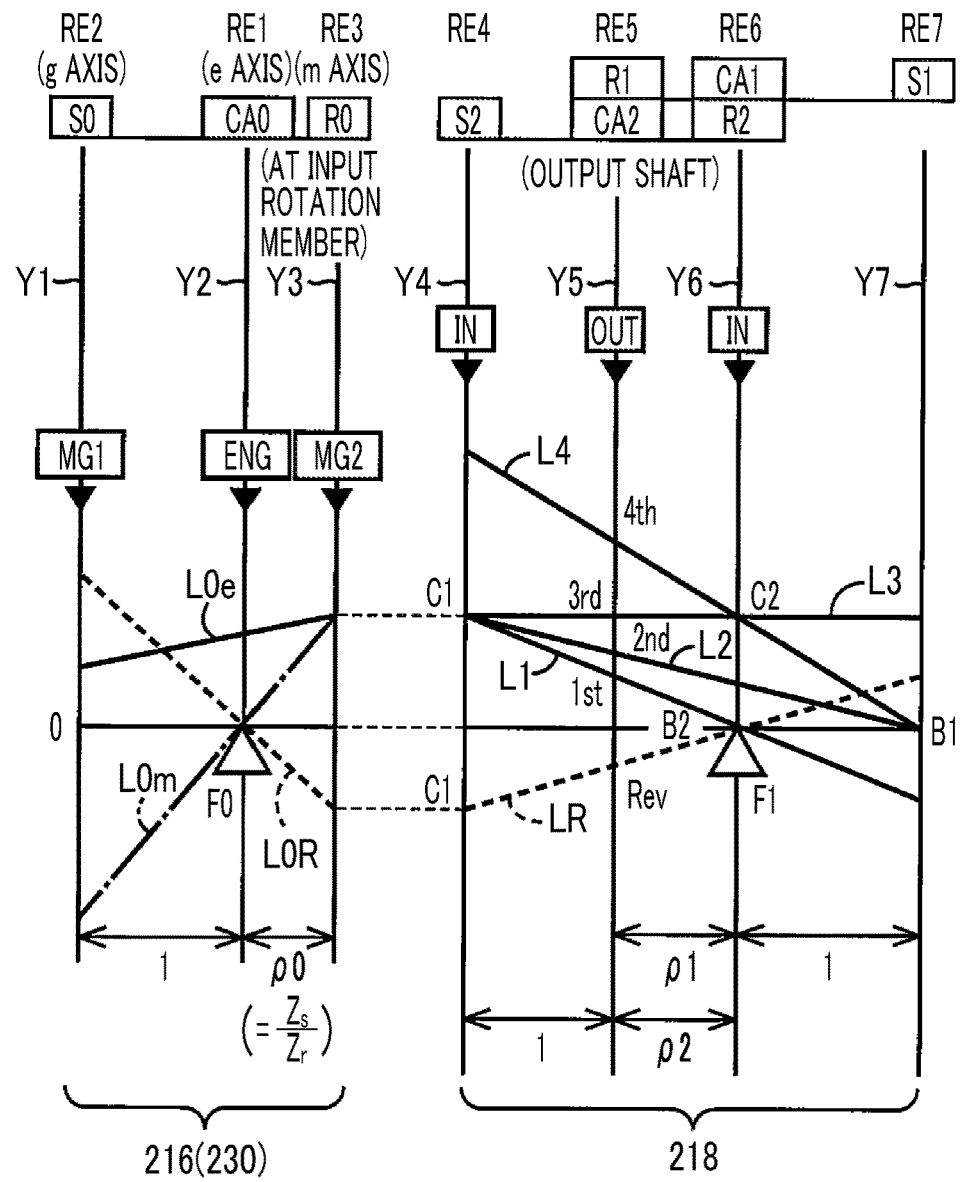
FIG. 11 is an operation chart illustrating a relationship between a shift operation of a mechanical stepped transmission unit illustrated in FIG. 10 and an operation combination of engagement devices used therefor.
FIG. 12 is an alignment chart that shows a relative relationship between rotation speeds of respective rotating elements in an electric continuously variable transmission unit and a mechanical stepped transmission unit.

As shown in the engagement operation table of FIG. 11, for example, the stepped transmission unit 218 includes, as a plurality of AT gear stages, an AT first gear stage ("1st" in the figure) to an AT fourth gear stage ("4th in the figure"), that is, four forward AT gear stages. The gear ratio γat of the AT first gear stage is the largest, and the gear ratio γat is smaller as the AT gear stage is higher. The reverse AT gear stage ("Rev" in the figure) is formed, for example, by engagement of the clutch C1 and engagement of the brake B2. That is, as will be described later, when the vehicle travels in the reverse direction, for example, the AT first gear stage is formed. The engagement operation table in FIG. 11 summarizes the relationship between AT gear stages and operating states of the engagement devices. In FIG. 11, "0" mark indicates engagement, "A" mark indicates engagement during engine braking or coast-down shift of the stepped transmission unit 218, and blank indicates release.

In the stepped transmission unit 218, an AT gear stage provided according to an accelerator operation by a driver (a person who drives a vehicle), a vehicle speed V, and the like is switched by an electronic control unit 240 to be described later, that is, the AT gear stages is selectively provided. For example, in the shift control of the stepped transmission unit 218, shift is performed by any switch-over of the engagement device CB, that is, a so-called clutch-to-clutch shift is performed where shift is performed by switching between engagement and release of the engagement device CB. In the embodiment, for example, a downshift from the AT second gear stage to the AT first gear stage is expressed as a 2→1 downshift. The same applies to other upshifts and downshifts.

The vehicle 200 further includes a one-way clutch F0. The one-way clutch F0 is a lock mechanism that can fix the carrier CA0 such that the carrier CA0 cannot rotate. That is, the one-way clutch F0 is a lock mechanism that can fix, to the case 214, the connection shaft 226 connected to the crankshaft of the engine 202 and rotating integrally with the carrier CA0. In the one-way clutch F0, one of two relatively rotatable members is integrally connected to the connection shaft 226, and the other is integrally connected to the case 214. The one-way clutch F0 runs idle in a positive rotation direction, which is a rotation direction during operation of the engine 202, and automatically engages in a rotation direction opposite to the rotation direction during operation of the engine 202. Accordingly, when the one-way clutch F0 runs idle, the engine 202 is in a state capable of rotating relative to the case 214. On the other hand, when the one-way clutch F0 is engaged, the engine 202 is not in the state capable of rotating relative to the case 214. That is, the engine 202 is fixed to the case 214 by the engagement of the one-way clutch F0. Thus, one-way clutch F0 allows rotation of carrier CA0 in the positive rotation direction, which is the rotation direction during operation of the engine 202, and suppresses rotation of carrier CA0 in the negative rotation direction. That is, the one-way clutch F0 is a lock mechanism that allows rotation of the engine 202 in the positive rotation direction and suppresses rotation of the engine 202 in the negative rotation direction.

FIG. 12 is an alignment chart showing a relative relationship between rotation speeds of respective rotating elements in the continuously variable transmission unit 216 and the stepped transmission unit 218. In FIG. 12, three vertical lines Y1, Y2, and Y3 corresponding to the three rotating elements of the differential mechanism 230 constituting the continuously variable transmission unit 216 are, in order from the left, a g axis representing a rotation speed of the sun gear S0 corresponding to the second rotating element RE2, an e axis representing a rotation speed of the carrier CA0 corresponding to the first rotating element RE1, and an m axis representing a rotation speed of the ring gear R0 corresponding to the third rotating element RE3 (that is, input rotation speed of the stepped transmission unit 218). In addition, four vertical lines Y4, Y5, Y6, Y7 of the stepped transmission unit 218 are, in order from the left, axes representing a rotation speed of the sun gear S2 corresponding to the fourth rotating element RE4, a rotation speed of the interconnected ring gear R1 and the carrier CA2 corresponding to the fifth rotating element RE5 (that is, the rotation speed of the output shaft 220), a rotation speed of the interconnected carrier CA1 and the ring gear R2 corresponding to the sixth rotating element RE6, and a rotation speed of the sun gear S1 corresponding to the seventh rotating element RE7, respectively. The intervals among the vertical lines Y1, Y2, Y3 are determined according to the gear ratio ρ0 of the differential mechanism 230. Further, intervals among the vertical lines Y4, Y5, Y6, Y7 are determined according to the gear ratios ρ1, ρ2 of the first and second planetary gear devices 232, 234.

When expressed by using the alignment chart of FIG. 12, in the differential mechanism 230 of the continuously variable transmission unit 216, a configuration is provided in which the rotation of the engine 202 is transmitted to the stepped transmission unit 218 through the intermediate transmission member 228 by connecting the engine 202 (see "ENG" in the figure) to the first rotating element RE1, connecting the first rotating machine MG1 (see "MG1" in the figure) to the second rotating element RE2, and connecting the second rotating machine MG2 (see "MG2" in the figure) to a third rotating element RE3 that rotates integrally with an intermediate transmission member 228. In the continuously variable transmission unit 216, the relationship between the rotation speed of the sun gear S0 and the rotation speed of the ring gear R0 is indicated by each of straight lines L0e, L0m, and L0R crossing the vertical line Y2.

In addition, in the stepped transmission unit 218, the fourth rotating element RE4 is selectively connected to the intermediate transmission member 228 through the clutch C1, the fifth rotating element RE5 is connected to the output shaft 220, and the sixth rotating element RE6 is selectively connected to the intermediate transmission member 228 through the clutch C2 and is selectively connected to the case 214 through the brake B2, and the seventh rotating element RE7 is selectively connected to the case 214 through the brake B1. In the stepped transmission unit 218, the rotation speed of each of "1st", "2nd", "3rd", "4th", "Rev" on the output shaft 220 is shown by each of the straight lines L1, L2, L3, L4, LR crossing the vertical line Y5 by the engagement/release control of the engagement device CB.

The straight line L0e and straight lines L1, L2, L3, L4 indicated by solid lines in FIG. 12 indicate relative speeds of respective rotating elements in forward traveling in a hybrid traveling mode that allows hybrid traveling, in which at least the engine 202 is used as a power source, to be performed. In the hybrid traveling mode, in the differential mechanism 230, when a reaction torque, which is a negative torque by the first rotating machine MG1 with respect to the engine torque Te input to the carrier CA0, is input to the sun gear S0 in positive rotation, a torque Td $(=Te/(1+\rho 0)=-(1/\rho 0)\times Tg)$ which is directly transmitted to the engine and is a positive torque in positive rotation appears in the ring gear R0. Then, according to the request driving force, the total torque of the torque Td which is directly transmitted to the engine and the MG2 torque Tm is used as the drive torque in the forward direction of the vehicle 200 and is transmitted to the drive wheels 206 through the stepped transmission unit 218 in which any one of the AT first gear stage to the AT fourth gear stage is formed. At this time, the first rotating machine MG1 functions as a generator generating negative torque in positive rotation. The battery 212 is charged with the generated electric power Wg of the first rotating machine MG1, and the second rotating machine MG2 consumes the generated electric power. The second rotating machine MG2 outputs the MG2 torque Tm by using all or some of the generated electric power Wg or by using the power from the battery 212 in addition to the generated power Wg.

The straight line L0m indicated by a dashed line in FIG. 12 and straight lines L1, L2, L3, L4 indicated by solid lines in FIG. 12 indicate relative speeds of respective rotating elements in forward traveling in a motor traveling mode that allows motor traveling, in which at least one of the first rotating machine MG1 and the second rotating machine MG2 are used as a power source, is performed in a state where the operation of the engine 202 is stopped. The motor traveling in the forward traveling in the motor traveling mode includes, for example, a single drive motor traveling in which just the second rotating machine MG2 is used as a power source, and a dual drive motor traveling in which both the first rotating machine MG1 and the second rotating machine MG2 are used as power sources. In the single drive motor traveling, the carrier CA0 is put into zero rotation, and the MG2 torque Tm that is a positive torque in the positive rotation is input to the ring gear R0. In this case, the first rotating machine MG1 connected to the sun gear S0 is set in a no-load state and is idled in negative rotation. In single drive motor traveling, the one-way clutch F0 is released, and the connection shaft 226 is not fixed to the case 214. In the dual drive motor traveling, when the MG1 torque Tg, which is a negative torque in negative rotation, is input to the sun gear S0 in a state where the carrier CA0 is put into the zero rotation, the one-way clutch F0 is automatically engaged such that the rotation of the carrier CA0 in the negative rotation direction is suppressed. In a state where carrier CA0 is non-rotatably fixed by engagement of the one-way clutch F0, a reaction torque by the MG1 torque Tg is input to the ring gear R0. In addition, the MG2 torque Tm is input to the ring gear R0 in the dual drive motor traveling, as in the single drive motor travel. When the MG1 torque Tg, which is a negative torque in the negative rotation, is input to the sun gear S0 in a state where the carrier CA0 has been brought to zero rotation, the single drive motor traveling by the MG1 torque Tg is also possible when the MG2 torque Tm is not input. In the forward traveling in the motor traveling mode, the engine 202 is not driven, the engine speed Ne is brought into zero, and at least one of the MG1 torque Tg and the MG2 torque Tm is used as a drive torque of the vehicle 200 in the forward direction and is transmitted to the drive wheels 206 through the stepped transmission unit 218 in which any one of the AT first gear stage to the AT fourth gear stage is formed. In the forward traveling in the motor traveling mode, the MG1 torque Tg is a powering torque of a negative rotation and a negative torque, and the MG2 torque Tm is a powering torque of a positive rotation and a positive torque.

The straight line L0R and the straight line LR, which are indicated by dashed lines in FIG. 12, indicate the relative speeds of the rotating elements in the reverse traveling in the motor traveling mode. In the backward traveling running in the motor traveling mode, the MG2 torque Tm, which is a negative torque in the negative rotation, is input to the ring gear R0, and the MG2 torque Tm is used as the drive torque in the reverse direction of the vehicle 200 and is transmitted to the drive wheels 206 through the stepped transmission unit 218 in which the AT first gear stage is formed. In the vehicle 200, an electronic control unit 240 to be described later causes the second rotating machine MG2 to output the MG2 torque Tm for backward traveling in a state where, for example, the AT first gear stage, which is the low AT gear stage for forward traveling, among the AT gear stages, is formed, where the MG2 torque Tm for backward traveling is opposite to the MG2 torque for forward traveling in the rotating direction, that is, positive and negative, during forward traveling. In backward traveling in the motor traveling mode, the MG2 torque Tm is a power torque of a negative rotation and a negative torque. In the hybrid traveling mode, it is possible to make the second rotating machine MG2 be rotated by the negative rotation as indicated by the straight line L0R. Thus, it is possible to perform the backward traveling as in the motor traveling mode.

In the hybrid traveling mode, when the rotation speed of the first rotating machine MG1 is controlled such that the rotation speed of the sun gear S0 is increased or decreased with respect to the rotation speed of the ring gear R0 constrained by the rotation of the drive wheels 206 due to the formation of the AT gear stage in the stepped transmission unit 218, the rotation speed of the carrier CA0, that is, the engine speed Ne is increased or decreased. Therefore, in hybrid traveling, it is possible to operate the engine 202 at an efficient operating point. That is, the stepped transmission unit 218, in which an AT gear stage is formed, and the continuously variable transmission unit 216, which is operated as the continuously variable transmission, can constitute the composite transmission 238a that functions as a continuously variable transmission as a whole. Accordingly, the composite transmission 238 can be a continuously variable transmission that transmits the power of the engine 202 to the drive wheels 206 and controls the gear ratio (=the engine speed Ne/AT output rotation speed No) such that the engine speed Ne reaches the target engine speed Netgt, and functions as a rotation adjusting device capable of mechanically adjusting the engine speed Ne. Alternatively, since the continuously variable transmission unit 216 can be shifted like a stepped transmission, the composite transmission 238 constituted by the stepped transmission unit 218, in which an AT gear stage is formed, and the continuously variable transmission unit 216, which performs gear shifting like a continuously variable transmission, can perform the gear shift like a stepped transmission as a whole.

The vehicle 200 further includes an electronic control unit 240 as a controller including a control device of the vehicle 200 related to control of the engine 202, the first rotating machine MG1, the second rotating machine MG2, and the like. The electronic control unit 240 has the same configuration as the electronic control unit 100 shown in the above first embodiment. Various signals and the like, which are similar to those supplied to the electronic control unit 100, are supplied to the electronic control unit 240. From the electronic control unit 240, various command signals, which are similar to those output by the electronic control unit 100, are output. The electronic control unit 240 has functions equivalent to the respective functions of the hybrid controller 102, the rotation change rate setting unit 104, and the state determination unit 106 included in the electronic control unit 100. Similarly to the electronic control unit 100 shown in the first embodiment that implements the control function, the electronic control unit 240 can perform a control function of appropriately increasing the drive torque Tw according to the acceleration request while establishing an appropriate relationship between the increase in the engine speed Ne and the increase in the drive torque Tw at the time of the acceleration request.

According to the embodiment, the same effects as in the above first embodiment can be obtained.

Figure 13:
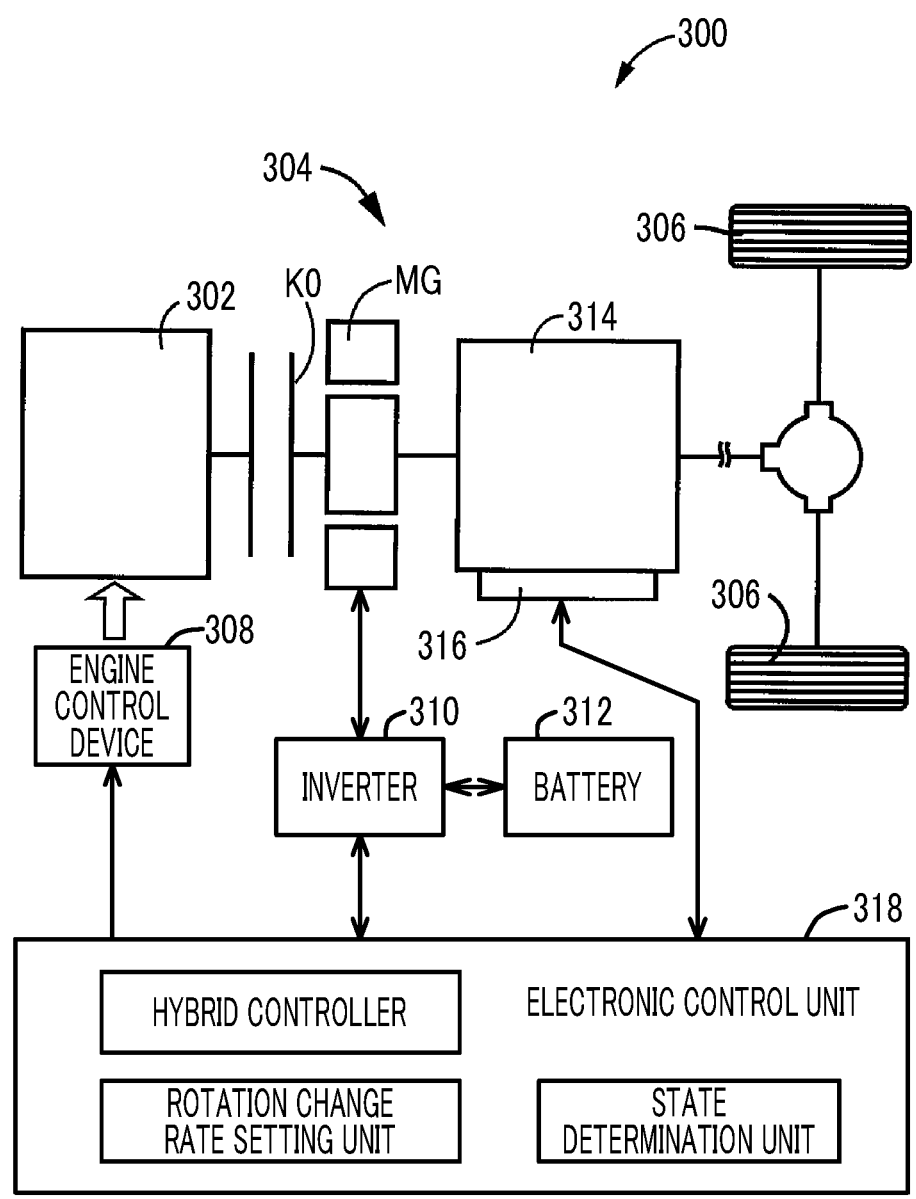
FIG. 13 is a diagram illustrating a schematic configuration of a vehicle to which the present disclosure is applied and which is different from the vehicles of FIG. 1 and FIG. 10.

The embodiment exemplifies a vehicle 300 as shown in FIG. 13, which is different from the vehicle 10 shown in the above first embodiment. FIG. 13 is a diagram illustrating a schematic configuration of a vehicle 300 to which the disclosure is applied. In FIG. 13, the vehicle 300 is a hybrid vehicle including an engine 302, a rotating machine MG, a power transmission device 304, and drive wheels 306.

The engine 302 has the same configuration as the engine 12 shown in the above first embodiment. In the engine 302, the engine torque Te is controlled by controlling an engine control device 308, such as an electronic throttle valve, a fuel injection device, an ignition device, and a wastegate valve provided in the vehicle 300, by an electronic control unit 318 to be described later.

The rotating machine MG is a rotating electric machine having a function as an electric motor and a function as a generator, and is a so-called motor generator. The rotating machine MG is a rotating machine connected to drive wheels 306 through a power transmission device 304 to transmit power. The rotating machine MG is connected to a battery 312 provided in the vehicle 300 through an inverter 310 provided in the vehicle 300. In the rotating machine MG, the MG torque Tmg, which is the output torque of the rotating machine MG, is controlled by controlling the inverter 310 by an electronic control unit 318 to be described later.

The power transmission device 304 includes a clutch K0, an automatic transmission 314, and the like. The input rotating member of the automatic transmission 314 is connected to the engine 302 through the clutch K0 and is also directly connected to the rotating machine MG. In the power transmission device 304, the power of the engine 302 is transmitted to the drive wheels 306 sequentially through the clutch K0, the automatic transmission 314, and the like, and the power of the rotating machine MG is transmitted to the drive wheels 306 through the automatic transmission 314, and the like. The engine 302 and the rotating machine MG are power sources for traveling of the vehicle 300, which are connected to the drive wheels 306 to transmit power.

The clutch K0 is a hydraulic frictional engagement device that connects and disconnects the power transmission path between the engine 302 and the drive wheels 306. The automatic transmission 314 is, for example, a known belt-type continuously variable transmission. In the automatic transmission 314, a primary thrust and a secondary thrust are respectively controlled by regulating a primary pressure and a secondary pressure by a hydraulic control circuit 316 provided in the vehicle 300 and driven by an electronic control unit 318 to be described later. In this way, in the automatic transmission 314, the gear ratio (=engine speed Ne/rotation speed of the output rotation member of the automatic transmission 314) is changed, and the belt clamping pressure is controlled such that the transmission belt does not slip. That is, the automatic transmission 314 is a continuously variable transmission that transmits the power of the engine 302 to the drive wheels 306 and that controls the gear ratio such that the engine speed Ne reaches the target engine speed Netgt, and functions as a rotation adjusting device capable of mechanically adjusting the engine speed Ne.

In the vehicle 300, in a state where the clutch K0 is released and the operation of the engine 302 is stopped, motor traveling using just the rotating machine MG as a power source for traveling is possible by using electric power from the battery 312. In the vehicle 300, in a state where the clutch K0 is engaged, hybrid traveling using at least the engine 302 as a power source for traveling is possible by operating the engine 302.

The vehicle 300 further includes an electronic control unit 318 as a controller including a control device of the vehicle 300 related to control of the engine 302, the rotating machine MG, and the like. The electronic control unit 318 has the same configuration as the electronic control unit 100 shown in the first embodiment. Various signals and the like, which are similar to those supplied to the electronic control unit 100, are supplied to the electronic control unit 318. From the electronic control unit 318, various command signals, which are similar to those output by the electronic control unit 100, are output. The electronic control unit 318 has functions equivalent to the respective functions of the hybrid controller 102, the rotation change rate setting unit 104, and the state determination unit 106 included in the electronic control unit 100. Similarly to the electronic control unit 100 shown in the first embodiment that implements the control function, the electronic control unit 318 can perform a control function of appropriately increasing the drive torque Tw according to the acceleration request while establishing an appropriate relationship between the increase in the engine speed Ne and the increase in the drive torque Tw at the time of the acceleration request. In the vehicle 300, the gear ratio of the automatic transmission 314 is controlled such that the Ne rising rate Rne at the time of the acceleration request is set to a value corresponding to the turbocharging pressure Pchg, and at this time, in order to compensate for the insufficient drive torque Tw, torque assist is performed by rotating machine MG that controls MG torque Tmg.

According to the embodiment, the same effects as in the above first embodiment can be obtained.

Although the embodiments of the disclosure have been described in detail with reference to the drawings, the disclosure is applicable to other modes.

For example, in the first embodiment described above, the vehicle 10 may be a vehicle in which the transmission unit 58 is not provided and the engine 12 is connected to the differential unit 60, like the vehicle 200. The differential unit 60 may be a mechanism capable of limiting a differential operation by controlling a clutch or a brake connected to a rotating element of the second planetary gear mechanism 82. The second planetary gear mechanism 82 may be a double pinion type planetary gear device. Further, the second planetary gear mechanism 82 may be a differential mechanism in which a plurality of planetary gear devices is connected to each other to have four or more rotating elements. The second planetary gear mechanism 82 may be a differential gear device in which the first rotating machine MG1 and the drive gear 74 are respectively connected to a pinion that is driven to rotate by the engine 12 and a pair of bevel gears that mesh with the pinion. The second planetary gear mechanism 82 may be a mechanism which has a configuration in which two or more planetary gear devices are connected to each other by some of the rotating elements constituting the planetary gear mechanisms, and the engine, the rotating machine, and the drive wheels are connected to the rotating elements of the planetary gear devices to transmit power.

Further, in the above-described second embodiment, the one-way clutch F0 is exemplified as the lock mechanism capable of fixing the carrier CA0 in a non-rotatable state, but the disclosure is not limited to this mode. This lock mechanism may be an engagement device such as a meshing type clutch, a hydraulic frictional engagement device such as a clutch and a brake, a dry engagement device, an electromagnetic frictional engagement device, a magnetic powder clutch, for example, for selectively connecting the connection shaft 226 and the case 214. Alternatively, the vehicle 200 does not necessarily need to include the one-way clutch F0.

Further, in the above-described second embodiment, the stepped transmission unit 218 is exemplified as the automatic transmission that forms a part of the power transmission path between the differential mechanism 230 and the drive wheels 206, but the disclosure is not limited to this mode. The automatic transmission may be, for example, a synchronous mesh-type parallel two-shaft automatic transmission, a well-known dual clutch transmission (DCT) that is the synchronous meshing parallel two-shaft type automatic transmission and has two systems of input shafts, and a well-known belt-type continuously variable transmission.

In the third embodiment described above, the vehicle 300 may further include a generator mechanically connected to the engine 302 and generating electric power by the power of the engine 302. This generator can control the engine speed Ne by controlling the generated electric power. That is, the generator is a rotating machine to which transmits the power of the engine 302 is transmitted and in which the output torque is controlled such that the engine speed Ne reaches the target engine speed Netgt, and can function as rotation adjusting device capable of mechanically adjusting the engine speed Ne. In the motor traveling in which the clutch KO is released as described above, a so-called series type hybrid traveling is possible in which the generator is generated by the engine 302 and the generated electric power is supplied to the rotating machine. In the series type hybrid traveling, the power of the engine 302 is converted into electric power, and the output torque from the rotating machine MG driven by the electric power is transmitted to the drive wheels 306. In this way, even in the series type hybrid traveling, it can be seen that the power of the engine 302 is transmitted to the drive wheels 306. Therefore, it is possible to apply disclosure to a known series-type hybrid vehicle.

Further, in the above-described embodiments, a mechanical pump type turbocharger that is driven to rotate by an engine or an electric motor may be provided in addition to the exhaust turbine type turbocharger 18. Alternatively, the turbocharger 18 may include an actuator capable of controlling the rotation speed of the compressor 18c, for example, an electric motor.

It should be noted that the above description is merely an embodiment, and that the present disclosure can be implemented in various modified and improved forms based on the knowledge of those skilled in the art.

What is claimed is:

1. A control device for a hybrid vehicle including an engine having a turbocharger, a rotation adjusting device to which the engine is mechanically connected to transmit power and that mechanically adjusts an engine speed of the engine, drive wheels to which power of the engine is transmitted, and a rotating machine connected to a power transmission path between the engine and the drive wheels to transmit power, the control device comprising:
    a rotation speed controller configured to control the rotation adjusting device such that a rate of change of the engine speed at a time of increasing the engine speed according to an acceleration request is smaller when turbocharging pressure by the turbocharger is lower than when the turbocharging pressure is higher; and
    a rotating machine controller configured to control output torque of the rotating machine to compensate for an insufficient drive torque of an actual output torque of the engine for a request output torque that is requested for the engine, when the rotation adjusting device is controlled such that the rate of change of the engine speed is set to a value corresponding to the turbocharging pressure,
    wherein the rotation adjusting device is a first rotating machine to which the power of the engine is transmitted and in which the output torque is controlled such that the engine speed reaches a target engine speed, and the rotating machine is a second rotating machine, and
    wherein the hybrid vehicle includes a differential mechanism that splits power of the engine to transmit the split power to the drive wheels and the first rotating machine.

2. The control device according to claim 1, wherein the rotation speed controller is configured to control the rotation adjusting device such that the rate of change of the engine speed increases as the turbocharging pressure increases.

3. The control device according to claim 1, wherein the rotation adjusting device is a continuously variable transmission which transmits the power of the engine to the drive wheels and in which a gear ratio is controlled such that the engine speed reaches a target value.

4. A control device for a hybrid vehicle including an engine having a turbocharger, a rotation adjusting device to which the engine is mechanically connected to transmit power and that mechanically adjusts an engine speed of the engine, drive wheels to which power of the engine is transmitted, and a rotating machine connected to a power transmission path between the engine and the drive wheels to transmit power, the control device comprising:
    a rotation speed controller configured to control the rotation adjusting device such that a rate of change of the engine speed at a time of increasing the engine speed according to an acceleration request is smaller when turbocharging pressure by the turbocharger is lower than when the turbocharging pressure is higher; and
    a rotating machine controller configured to control output torque of the rotating machine to compensate for an insufficient drive torque of an actual output torque of the engine for a request output torque that is requested for the engine, when the rotation adjusting device is controlled such that the rate of change of the engine speed is set to a value corresponding to the turbocharging pressure,
    wherein the rotation adjusting device is a first rotating machine to which the power of the engine is transmitted and in which the output torque is controlled such that the engine speed reaches a target value, and the rotating machine is a second rotating machine,
    wherein the hybrid vehicle includes a differential mechanism that splits power of the engine to transmit the split power to the drive wheels and the first rotating machine, and wherein the rotation speed controller is configured to control the rotation adjusting device such that the rate of change of the engine speed increases as the turbocharging pressure increases.

5. A control device for a hybrid vehicle including an engine having a turbocharger, a rotation adjusting device to which the engine is mechanically connected to transmit power and that mechanically adjusts an engine speed of the engine, drive wheels to which power of the engine is transmitted, and a rotating machine connected to a power transmission path between the engine and the drive wheels to transmit power, the control device comprising:
- a rotation speed controller configured to control the rotation adjusting device such that a rate of change of the engine speed at a time of increasing the engine speed according to an acceleration request is smaller when turbocharging pressure by the turbocharger is lower than when the turbocharging pressure is higher; and
- a rotating machine controller configured to control output torque of the rotating machine to compensate for an insufficient drive torque of an actual output torque of the engine for a request output torque that is requested for the engine, when the rotation adjusting device is controlled such that the rate of change of the engine speed is set to a value corresponding to the turbocharging pressure, wherein the rotation adjusting device is a first rotating machine to which the power of the engine is transmitted and in which the output torque is controlled such that the engine speed reaches a target engine speed, and the rotating machine is a second rotating machine, wherein the hybrid vehicle includes a differential mechanism that splits power of the engine to transmit the split power to the drive wheels and the first rotating machine, wherein the rotation speed controller is configured to control the rotation adjusting device such that the rate of change of the engine speed increases as the turbocharging pressure increases, and wherein the rotation adjusting device is a continuously variable transmission which transmits the power of the engine to the drive wheels and in which a gear ratio is controlled such that the engine speed reaches a target value.

* * * * *